(12) United States Patent
Blancke et al.

(10) Patent No.: US 12,488,886 B2
(45) Date of Patent: Dec. 2, 2025

(54) ELECTRONICALLY-CONTROLLED CAPTURING SYSTEM FOR DRUG DELIVERY SYSTEMS

(71) Applicant: Sanofi, Paris (FR)

(72) Inventors: Stefan Blancke, Frankfurt am Main (DE); Jörg Bigalke, Frankfurt am Main (DE); Philipp Troebner, Frankfurt am Main (DE); Maurice Toporek, Frankfurt am Main (DE); Stefan Alt, Frankfurt am Main (DE)

(73) Assignee: Sanofi, Paris (FR)

( * ) Notice: Subject to any disclaimer, the term of this patent is extended or adjusted under 35 U.S.C. 154(b) by 935 days.

(21) Appl. No.: 17/617,052

(22) PCT Filed: Jun. 12, 2020

(86) PCT No.: PCT/EP2020/066375
§ 371 (c)(1),
(2) Date: Dec. 7, 2021

(87) PCT Pub. No.: WO2020/249777
PCT Pub. Date: Dec. 17, 2020

(65) Prior Publication Data
US 2022/0319686 A1 Oct. 6, 2022

(30) Foreign Application Priority Data
Jun. 13, 2019 (EP) .................... 19305753

(51) Int. Cl.
*G16H 40/63* (2018.01)
*A61M 5/315* (2006.01)
(Continued)

(52) U.S. Cl.
CPC ........ *G16H 40/63* (2018.01); *A61M 5/31568* (2013.01); *G06F 21/602* (2013.01);
(Continued)

(58) Field of Classification Search
CPC .......... A61M 5/31568; A61M 5/31566; A61M 5/50; A61M 5/31565; A61M 5/31571;
(Continued)

(56) References Cited

U.S. PATENT DOCUMENTS

| 5,131,816 A * | 7/1992 | Brown .............. A61M 5/14228 417/18 |
| 2001/0031944 A1* | 10/2001 | Peterson .......... A61M 5/14228 604/151 |

(Continued)

FOREIGN PATENT DOCUMENTS

| CN | 101573717 A | 11/2009 |
| CN | 104067439 A | 9/2014 |

(Continued)

OTHER PUBLICATIONS

International Preliminary Report on Patentability in International Application No. PCT/EP2020/066375, dated Dec. 14, 2021, 10 pages.

(Continued)

*Primary Examiner* — Nilay J Shah
(74) *Attorney, Agent, or Firm* — Bond, Schoeneck & King, PLLC

(57) ABSTRACT

An electronically-controlled capturing system for capturing data representing an amount of a drug expelled or discharged from a drug reservoir includes an electronic circuit including an electric energy unit, a processing unit operable by electric power obtained from the electric energy unit and operable to acquire data, and an electronic storage unit connected to the processing unit and configured to store the acquired data. The processing unit is operable to write the acquired data in the storage unit and is operable to read and provide the stored data from the electronic storage unit. The capturing system also includes a data reading disabling unit operably connected to the processing unit, the electronic storage unit (Continued)

and/or the electric energy unit. The data reading disabling unit is switchable into an activated state, in which the data reading disabling unit persistently prevents readout or providing of stored data from the electronic storage unit.

18 Claims, 5 Drawing Sheets

(51) Int. Cl.
  *G06F 21/60* (2013.01)
  *G16H 20/13* (2018.01)
  *G16H 20/17* (2018.01)
(52) U.S. Cl.
  CPC ............. *G16H 20/13* (2018.01); *G16H 20/17* (2018.01); *A61M 2205/50* (2013.01)
(58) Field of Classification Search
  CPC .. A61M 2205/3592; A61M 2205/3584; A61M 2205/3576; A61M 2205/3546; A61M 2205/3553; A61M 2205/3561; A61M 2205/3569; G16H 40/63; G16H 20/17
  See application file for complete search history.

(56) References Cited

U.S. PATENT DOCUMENTS

| | | |
|---|---|---|
| 2007/0158268 A1 | 7/2007 | DeComo |
| 2008/0188813 A1 | 8/2008 | Miller et al. |
| 2015/0202377 A1* | 7/2015 | Haupt .................... G16H 20/17 604/207 |

FOREIGN PATENT DOCUMENTS

| | | |
|---|---|---|
| CN | 104755118 A | 7/2015 |
| EP | 1804868 | 12/2009 |
| EP | 2729202 | 5/2018 |
| JP | 2011188941 A | 9/2011 |
| JP | 2015-505682 A | 2/2015 |
| JP | 2016-512442 A | 4/2016 |
| JP | 2017-504906 A | 2/2017 |
| JP | 2017-523001 A | 8/2017 |
| KR | 100635724 B1 | 10/2006 |
| WO | WO 2006/045525 | 5/2006 |
| WO | 2008035296 A2 | 3/2008 |
| WO | WO 2013/072444 | 5/2013 |
| WO | WO 2014/067879 A1 | 5/2014 |
| WO | WO 2014/123998 A2 | 8/2014 |
| WO | WO 2015/114372 A1 | 8/2015 |
| WO | WO 2016/022865 A1 | 2/2016 |
| WO | WO 2016/115372 | 7/2016 |
| WO | WO 2018/104292 | 6/2018 |
| WO | WO 2018/141764 | 8/2018 |

OTHER PUBLICATIONS

International Search Report and Written Opinion in International Application No. PCT/EP2020/066375, dated Jul. 2, 2020, 13 pages.
Search Report, CN Patent Application No. 2020800432954, dated Oct. 31, 2024, pp. 1-3 (with pp. 1-2 being a translation).
Second Office Action, CN Patent Application No. 2020800432954, dated Oct. 31, 2024, pp. 1-21 (with pp. 1-13 being a translation).

* cited by examiner

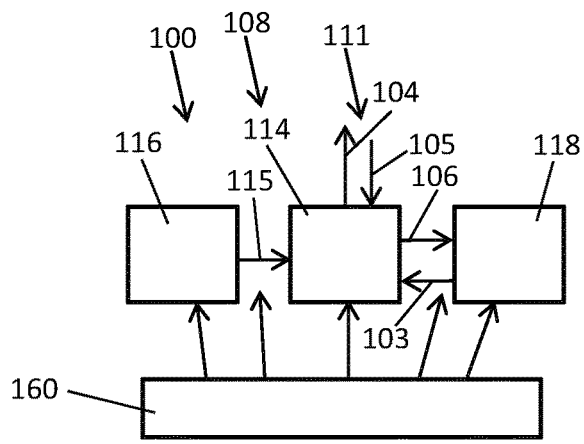
Fig. 6
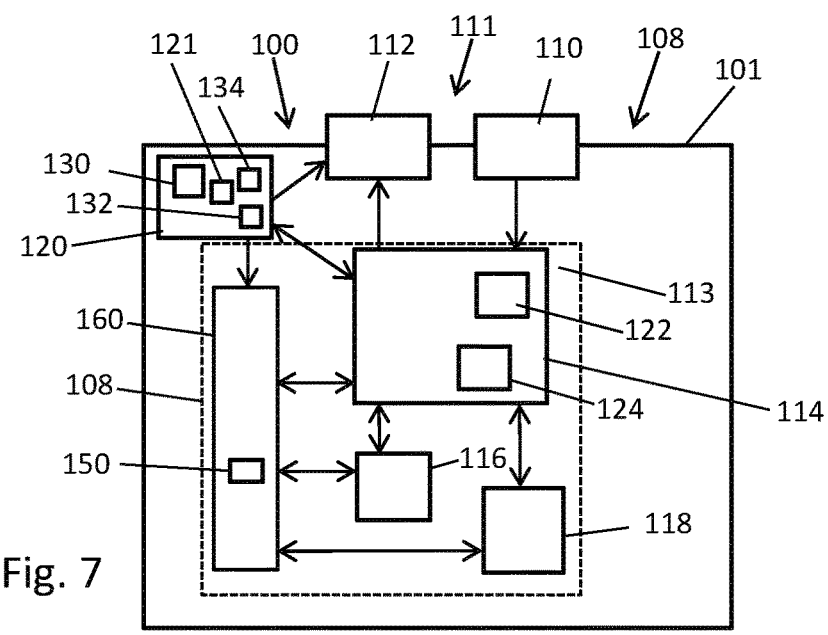
Fig. 7
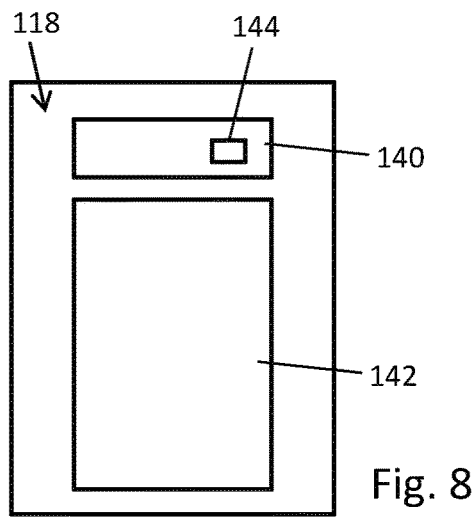
Fig. 8
| No. | Time | Amount |
|---|---|---|
| 99 | 7:59 | 20 |
| 98 | 20:03 | 30 |
| 97 | 8:06 | 20 |
| 96 | 19:55 | 30 |
| 95 | 7:53 | 20 |
| 94 | 20:05 | 30 |
| 93 | 8:03 | 20 |
| ... | ... | ... |
Fig. 9

ELECTRONICALLY-CONTROLLED CAPTURING SYSTEM FOR DRUG DELIVERY SYSTEMS

CROSS-REFERENCE TO RELATED APPLICATIONS

The present application is the national stage entry of International Patent Application No. PCT/EP2020/066375, filed on Jun. 12, 2020, and claims priority to Application No. EP 19305753.6, filed on Jun. 13, 2019, the disclosures of which are incorporated herein by reference.

TECHNICAL FIELD

The present disclosure relates to drug delivery systems and, in particular, to drug delivery systems for parenteral administration of drugs or medicaments.

BACKGROUND

Drug delivery systems and drug delivery devices for setting and dispensing single or multiple doses of a liquid medicament are well-known in the art. Generally, such devices may have a substantially similar purpose to an ordinary syringe.

Drug delivery devices, such as pen-type injectors, have to meet a number of user-specific requirements. For instance, with patient's suffering chronic diseases, such as diabetes, the patient may be physically infirm and may also have impaired vision. Suitable drug delivery devices, especially those intended for home medication, therefore need to be robust in construction and should be easy to use. Furthermore, manipulation and general handling of the device and its components should be intelligible and easy understandable. Such injection devices should provide setting and subsequent dispensing of a dose of a medicament of variable size. Moreover, a dose setting as well as a dose dispensing procedure must be easy to operate and has to be unambiguous.

Typically, such devices comprise a housing or a particular cartridge holder adapted to receive a drug reservoir, such as a cartridge, at least partially filled with the medicament to be dispensed or expelled. The device further comprises a drive mechanism, usually having a displaceable piston rod, to operably engage with a bung or piston of the cartridge. By means of the drive mechanism and its piston rod, the bung or piston of the cartridge is displaceable in a distal or dispensing direction and may therefore expel a predefined amount of the medicament via a piercing assembly, e.g., an injection needle, which is to be releasably coupled with a distal end section of the housing of the drug delivery device. Other drug delivery systems may comprise a pump providing a rather continuous parenteral administration of a liquid medicament, e.g., by way of infusion.

With some drug delivery devices, such as pen-type injection devices, a user may have to set a dose of variable size by rotating a dose dial and a dose dial sleeve in a clockwise or dose-incrementing direction relative to a body or housing of the injection device. For injecting and expelling of a dose of a liquid medicament the user may have to depress a trigger or dose button in a distal direction and hence towards the body or housing of the injection device. Typically, the user uses their thumb for exerting a distally directed pressure onto the dose button, which is located at a proximal end of the dose dial and the dose dial sleeve, while holding the housing of the injection device with the remaining fingers of the same hand.

Some drug delivery devices, such as pen-type injectors are configured as disposable devices. They are pre-filled with an injectable medicament. When the medicament is used up the entire drug delivery device is intended to be discarded. Reusable drug delivery devices, e.g., pen-type injectors, are equipped with a drug reservoir, which is intended to be exchanged when the medicament contained therein has been used up. Such reusable drug delivery devices or injection devices enable a replacement of a medicament reservoir or medicament container, such as a cartridge.

SUMMARY

For injection devices it may be desirable to enable a precise, reliable and quasi automated supervising and/or collection of administration-related data, e.g., injection-related data during use of the drug delivery device or injection device. Some drug delivery devices may be equipped with an electronically implemented add-on device or data capturing device configured to monitor user-induced operation of the injection device. Some other drug delivery devices may comprise an integrated data capturing unit or data capturing device configured to capture and/or to collect data with regards to the administration of a medicament to a patient. The data capturing unit or devices are of particular use for patient being physically infirm or facing problems in correctly remembering a size of a dose to be administered or a point of time when the medicament has to be administered.

Data capturing systems and data capturing devices for use with drug delivery systems or drug delivery devices may collect rather personal data, e.g., being indicative of an amount of a particular medicament administered to a particular patient. This rather sensitive data may remain in an electronic storage of such capturing systems even if the related injection device or injection system is no longer in use. Drug delivery systems or drug delivery devices comprising an integrated data capturing system or data capturing device may reach an end-of-lifecycle and should be then no longer used. This applies particularly to disposable drug delivery devices or injection devices, that are intended to become discarded after use in its entirety. When the end of a lifecycle of at least one of a data capturing system or of a related drug delivery system or drug delivery device has been reached, the data captured and stored in the capturing system should be protected against unauthorized use.

It is therefore desirable to provide a capturing system for capturing data regarding an amount of a drug expelled or discharged by a drug delivery system, which capturing system provides prevention of unauthorized use of the captured data when the end of a lifecycle of the capturing system and/or of the related drug delivery system or drug delivery device has been reached. Insofar, the capturing system aims to prevent unauthorized use of personal data captured during use of a drug delivery system or drug delivery device.

The present disclosure relates to an electronically-controlled capturing system for capturing data representing an amount of a drug expelled or discharged from a drug reservoir by a drug delivery system. The disclosure also relates to electronically-controlled capturing systems provided as stand-alone devices or as separate devices configured to become connected or attached to drug delivery systems. The disclosure further relates to electronically-controlled capturing systems integrated into a drug delivery system, such as an injection device, an infusion device, such as a pen-type injector or infusion pump.

In one example, the present disclosure relates to an electronically-controlled capturing system for capturing data representing an amount of a drug expelled or discharged from a drug reservoir by a drug delivery system or drug delivery device. The capturing system comprises an electronic circuit. The electronic circuit comprises an electric energy unit comprising a reservoir of electric energy. The electronic circuit further comprises a processing unit operable by electric power obtained from the electric energy unit. The processing unit is operable to acquire data. The electronic circuit further comprises an electronic storage unit. The electronic storage unit is connected to the processing unit. The electronic storage unit is configured to store the acquired data. In particular, the electronic storage unit is configured to store data previously acquired by the processing unit. The processing unit is further operable to write the acquired data in the electronic storage unit. The processing unit is also operable to read the stored data from the electronic storage unit. The processing unit is also operable to provide the stored data from the electronic storage unit.

The electronic circuit further comprises a data reading disabling unit operably connected to at least one of the processing unit, the electronic storage unit and the electric energy unit. The data reading disabling unit is switchable into an activated state. In the activated state the data reading disabling unit persistently prevents at least one of readout of stored data from the electronic storage unit or providing of stored data from the electronic storage unit. The data reading disabling unit of the electronic circuit provides inhibition of data access to data previously acquired by the processing unit and/or stored in the electronic storage unit during a lifecycle of the electronically-controlled capturing system and/or during a lifecycle of the drug delivery system associated to the electronically-controlled capturing system.

In the activated state the data reading disabling unit may be configured to disable operation of the processing unit. Here, the data reading disabling unit may be configured to either shut down the processing unit or to disconnect the processing unit from any further data processing device, such as a transmission interface. Hence, the data reading disabling unit may be configured to disable data communication at least from the processing unit. Moreover, the data reading disabling unit may be operably connected to the processing unit in such a way, that the data reading disabling unit may disconnect the processing unit from at least one of the electric energy unit and the electronic storage unit.

Hence, the data reading disabling unit may be configured to cut off the processing unit from at least one of the electric energy unit or from the electronic storage unit. In this way, data stored in the electronic storage unit may no longer be acquired from the electronic storage unit. Here, the processing unit may be void of an own electronic storage. In addition, the electronic storage unit is only accessible via the processing unit. The electronic storage unit and the processing unit are integral components of the electronic circuit. Data stored inside the processing unit may be acquired and readout via the processing unit.

With other examples and when the data reading disabling unit is operably connected to the electronic storage unit the data reading disabling unit may be further configured to cut off a data connection between the electronic storage unit and the processing unit.

Additionally or alternatively, the data reading disabling unit may be operable to corrupt and/or to destroy data stored in the electronic storage unit. With some examples, the data reading disabling unit may be configured to modify the stored data in the electronic storage unit in such a way, that the data effectively becomes unusable. Moreover, the data reading disabling unit may be operable to delete the stored data in the electronic storage unit. The data reading disabling unit may be also operable to reorganize or to disorganize a memory management of the electronic storage unit. In this way the data may remain in the electronic storage unit but cannot be readout in a controlled manner.

With further examples and when the data reading disabling unit is operably connected to the electric energy unit, the data reading disabling unit, when switched in the activated state, may be configured to disconnect the electric energy unit from at least one of the processing unit and the electronic storage unit. By disconnecting the electric energy unit from the processing unit, the processing unit becomes substantially inoperable. As long as the data reading disabling unit is in the activated state the electric energy unit is and remains disconnected from at least one of the processing unit and the electronic storage unit. In this way, the data reading disabling unit is configured to cut off an electric power supply for the processing unit and/or for the electronic storage unit. When the processing unit is cut off from the electric energy unit through activation of the data reading disabling unit, a readout and providing of data stored in the electronic storage unit is effectively disabled. In the other case and when due to activation of the data reading disabling unit the electronic storage unit is disconnected or cut off from the electric energy unit the processing unit becomes inoperable to access stored data allocated in the electronic storage unit.

With other examples, the data reading disabling unit is operably connected to the electric energy unit in such a way, that the data reading disabling unit is operable to deplete or to release electric energy of the electric energy unit when switched into the activated state.

As long as the data reading disabling unit is and remains in the activated state the data reading disabling unit persistently prevents readout of stored data from the electronic storage unit or providing of stored data from the electronic storage unit.

In particular and when switched into the activated state, the data reading disabling unit is operable to disconnect or to destroy a communication or connection between the electric energy unit and the processing unit, between the processing unit and the electronic storage unit and/or between the electric energy unit and the electronic storage unit. With further examples and when switched into the activated state, the data reading disabling unit is configured to modify the configuration, constitution or operation of at least one of the electric energy unit, the processing unit and the electronic storage unit.

In either way and with all examples of the electronically-controlled capturing system, once the data reading disabling unit has been activated the data stored in the electronic storage unit is and remains persistently inaccessible. Even if the data reading disabling unit were switchable into a deactivated state, the data would remain persistently inaccessible.

In a further example, the data reading disabling unit is irreversibly switchable into the activated state. Typically and during the entire lifecycle of the electronically-controlled capturing system and/or of the associated drug delivery system or drug delivery device the data reading disabling unit is in the deactivated state. Through action by a user or when the end-of-lifecycle of the electronically-controlled capturing system or of the drug delivery system has been reached the data reading disabling unit is manually or autonomously switched from the deactivated state into the activated state, thereby persistently preventing at least one of readout of stored data from the electronic storage unit or providing of stored data from the electronic storage unit. Once the data reading disabling unit has been switched into the activated state it cannot be switched back into the deactivated state.

With some examples, switching of the data reading disabling unit from the deactivated state into the activated state leads to an irreversible shutdown of the processing unit or disconnection of the processing unit from at least one of the electric energy unit and the electronic storage unit. Such a shutdown or disconnection is of irreversible type. In other words, once the processing unit has been subject to a shutdown it cannot be reactivated. Moreover, once the processing unit has been disconnected from the electronic storage unit or from a further data processing device it cannot reconnect to the electronic storage unit or to the further data processing device, e.g., implemented as a transmission interface.

Moreover and when the activation of the data reading disabling unit comprises cutting off the processing unit from the electric energy unit, such a cut off is of irreversible type. Once the processing unit has been cut off from the electric energy unit and/or from the electronic storage unit such a disconnection cannot be re-established even when a switching of the data reading disabling unit from the activated state back into the deactivated state should be possible.

Hence, a first or one time activation of the data reading disabling unit typically has an irreversible effect on one of the electric energy unit, the processing unit and the electronic storage unit and/or on the connection between any two of the electric energy unit, the processing unit and the electronic storage unit. By switching the data reading disabling unit into the activated state, at least one of the processing unit, the electronic storage unit and the processing unit may become irreversibly modified or reconfigured such that a readout of stored data and/or providing of data to a further data processing device, e.g., a transmission interface will be persistently blocked and will be thus no longer possible.

According to a further example, the reservoir of electric energy is a finite reservoir of electric energy. Additionally or alternatively the reservoir of electric energy is non-rechargeable. In particular, the reservoir of electric energy may comprise a non-replaceable and/or non-rechargeable battery. In particular, the reservoir of electric energy comprises a non-replaceable and non-rechargeable electric battery. In this way and once the electric power of the electric energy unit has been consumed, any further operation of the electronically-controlled capturing system is disabled due to a loss of power. The data reading disabling unit may be operable to invoke a premature depleting or disconnecting of the finite reservoir of electric energy when switched into the activated state. Hence, with a finite reservoir of electric energy and, in particular with a non-replaceable and non-rechargeable battery, the data reading disabling unit may be configured to deplete electric energy from the reservoir of electric energy such that a further electric operation of the electronically-controlled capturing system is disabled.

According to another embodiment, the data reading disabling unit is operable to disconnect the processing unit from at least one of the electronic storage unit and the electric energy unit when in the activated state. In particular, the data reading disabling unit is operable to irreversibly disconnect the processing unit from at least one of the electronic storage unit and the electric energy unit when switched into the activated state. Here, it is of particular benefit when the data reading disabling unit is irreversibly switchable into the activated state. Accordingly, once the data reading disabling unit has been switched into the activated state, the processing unit is disconnected from at least one of the electronic storage unit and the electric energy unit. Disconnecting the processing unit from the electronic storage unit persistently and/or irreversibly disables readout of stored data from the electronic storage unit. Disconnecting the processing unit from the electric energy unit leads to the total inoperability of the electronic circuit. In this way, data stored in the electronic storage unit is and remains inaccessible.

According to a further example, the data reading disabling unit is operable to disconnect the electric energy unit from the processing unit when in the activated state. Alternatively or additionally the data reading disabling unit is operable to disconnect the electric energy unit from the electronic storage unit when in the activated state. With some particular examples the data reading disabling unit is operable to irreversibly disconnect the electric energy unit from at least one of the processing unit and the electronic storage unit when in the activated state. By disconnecting the electric energy unit from the processing unit, the processing unit may no longer be provided with electric energy sufficient to drive the processing unit. With some examples and when the electronic storage unit comprises a volatile storage, by disconnecting the electric energy unit from the electronic storage unit the data stored in the volatile storage may be automatically deleted or corrupted in such a way, that a readout of stored data is effectively prevented.

According to a further example, the data reading disabling unit is operable to discharge the electric energy unit when in the activated state. By activating the data reading disabling unit the electric energy unit may be discharged. Electric energy provided in the electric energy unit may be depleted by switching the data reading disabling unit into the activated state. For this, the data reading disabling unit may comprise a mechanical switch or micromechanical switch, which, when activated leads to a depletion of electric energy of the electric energy unit. The switch or micromechanical switch may be operable to provide a short circuit or bypass in order to deplete remaining electric energy from the electric energy unit upon activation of the data reading disabling unit.

With this example and when the data reading disabling unit is operable to discharge or to deplete electric energy from the electric energy unit, the electric energy unit is typically implemented as a finite reservoir of electric energy. Here, the electric energy unit may consist of a non-rechargeable and non-replaceable battery. If the electric energy of the electric energy unit has been depleted or dissipated to a predefined degree a further operation of the electronically-controlled capturing system is disabled for the future.

According to a further example, the data reading disabling unit is operable to delete stored data from the electronic storage unit when in the activated state. Moreover, by switching the data reading disabling unit into the activated state, stored data in the electronic storage unit may be deleted, in particular irreversibly deleted. Here, the data reading disabling unit may be configured to rewrite or to overwrite numerous volatile or non-volatile storage blocks of the electronic storage unit. By overwriting stored data in the volatile or non-volatile storage of the electronic storage unit the data previously stored in the electronic storage unit is unrecoverably lost. A readout of rather sensitive personal data captured and stored in the electronic storage unit is permanently disabled.

In a further example, the data reading disabling unit is operable to encrypt acquired data or stored data in the electronic storage unit when in the activated state. Typically, the data reading disabling unit is operable to irreversibly encrypt the acquired data or stored data upon and/or after being switched in the activated state.

Here and upon switching of the data reading disabling unit data obtained from the processing unit and/or data previously stored in the electronic storage unit becomes irreversibly encrypted. For this an encryption routine is provided and executed using an encryption key with a predetermined bit size. The length of the encryption key is selected in accordance to available computational power. Typically, the encryption key is selected such, that even by use of a super computer with a maximum of available computational power would require several years to crack the encryption code or key.

With this example, the data acquired by the processing unit is and remains stored in the electronic storage unit. However, the data is irreversibly encrypted and cannot be decoded with nowadays available computational means. In this way, the encrypted acquired or stored data cannot be readout and/or provided from the electronic storage.

According to another example, the data reading disabling unit is operable to prevent decryption of stored data when in the activated state, wherein the stored data is stored in the electronic storage unit in an encrypted format. Here and with this example the processing unit is operable to decrypt acquired data and to store the data in the processing unit in an encrypted format. As long as the data reading disabling unit is inactive and is hence in the deactivated state, the processing unit is operable to decrypt data stored in the electronic storage unit in an encrypted format. However and upon activation of the data reading disabling unit, the decryption capability of the processing unit is disabled. The decryption capability of the processing unit is typically irreversibly disabled.

Disabling of a decryption capability of the processing unit may be provided in many different ways. A particular functionality of the processing unit may be permanently deactivated upon switching of the data reading disabling unit into the activated state. Here, the data reading disabling unit may be operable to manipulate or to reconfigure the processing unit in such a way that in response to an activation of the data reading disabling unit the decryption capability of the processing unit is permanently disabled. Here, the disabling of the decryption capability of the processing unit may be software implemented. For instance, a decryption or encryption key locally stored in the processing unit may be modified or corrupted such that the decryption or encryption key got unrecoverably lost.

With another example, the disabling of the decryption capability of the processing unit may be provided by storing a respective encryption key or decryption key in a volatile memory block of the electronic storage unit. By activating the data reading disabling unit the supply of electric energy for the electronic storage unit may be cut off. In this way, the encryption or decryption key stored in the volatile memory is unrecoverably lost. Without the respective encryption or decryption key the data stored in the electronic storage unit in an encrypted format cannot be decrypted. In effect, the encrypted data is unrecoverably lost without access to the decryption or encryption key. With another example the encryption or decryption key is simply deleted upon activation of the data reading disabling unit.

According to another example, the electronically-controlled capturing system further comprise a data transmission interface that is connected to the processing unit and which is connectable to an external electronic device in a data transmissive way. Here, the data reading disabling unit is operable to disrupt or to disable a data transmitting connection between the processing unit and the data transmission interface. With some examples, the data reading disabling unit is operable to irreversibly disrupt or to irreversibly disable the data transmitting connection between the processing unit and the data transmission interface. In this way, the processing unit may be further operable to read out data from the electronic storage unit but would be incapable to provide the data read from the electronic storage unit to the data transmission interface. Alternatively, the data reading disabling unit may be configured or operable to modify or to reconfigure the data transmission interface in such a way, that a submission of data from the electronically-controlled capturing system to the external electronic device is no longer possible.

For this, the data reading disabling unit is configured to interrupt or to destroy the data transmitting connection between the processing unit and the data transmission interface. The data reading disabling unit may be configured to irreversibly interrupt or to irreversibly destroy the data transmitting connection between the processing unit and the data transmission interface. Additionally or alternatively the data reading disabling unit may be configured to disable operation of the data transmission interface or a data transmitting capability of the processing unit. In addition or as a further alternative the data reading disabling unit may be operable to irreversibly modify or to irreversibly reconfigure a data transmission protocol of at least one of the data transmission interface and the processing unit. In this way, a data transmitting communication between the processing unit and the data transmission interface may be persistently and/or irreversibly disabled.

With numerous examples, the data reading disabling unit is implemented all electronically. With some examples the data reading disabling unit is entirely software implemented. The data reading disabling unit may be implemented as a logic unit of at least one of the electric energy unit, the processing unit or the electronic storage unit. With other examples the data reading disabling unit is hardware implemented. It may be implemented by a piece of hardware in electric connection with at least one of the electric energy unit, the processing unit and the electronic storage unit. Moreover, the data reading disabling unit may be provided and implemented as a separate mechanical or electromechanical component operably connected to at least one of the processing unit, the electronic storage unit and the electric energy unit. The data reading disabling unit may be manually activatable by a user, simply by depressing a button or some other type of mechanical actuation member. By manually activating the data reading disabling unit a hardware modification of the electronically-controlled capturing system could be easily implemented, wherein the hardware modification is typically of irreversible type. Once the hardware has been modified by activation of the data reading disabling unit, the operation of at least one of the electric energy unit, the processing unit and the electronic storage unit is modified in such a way, that read out of stored data is no longer possible.

In addition or in an alternative, the mutual interaction between at least two of the electric energy unit, the processing unit and the electronic storage unit is modified or reconfigured in such a way, that read out of stored data from the electronic storage is persistently disabled.

With some examples of the capturing system and when the capturing system comprises a data transmission interface connected to the processing unit, activation of the data reading disabling unit and hence switching of the data reading disabling unit into the activated state is blocked as long as the data stored in the electronic storage unit has not been transmitted to an external electronic device via the data transmission interface. In other words, activation of the data reading disabling unit requires a transmission of stored data from the electronic storage via the data transmission interface to the external electronic device. In this way, it is guaranteed, that the acquired data stored in the storage unit has been processed further and has been subject to a backup. In particular, the stored data may be processed further for data analysis, e.g., for checking compliance with a prescribed medication schedule.

With some examples, prevention of stored data readout or stored data providing from the electronic storage unit only applies to a portion of the data stored in the storage unit. At least one of the data reading disabling unit, the electronic storage unit and the processing unit may be configured to disable readout or providing of the stored data only for data that is older than a predefined time interval preceding the actual time. Here, the data reading disabling unit may be configured to define an expiry period of time. In this way the data reading disabling unit may be operable to prevent at least one of readout of stored data from the electronic storage unit or providing of stored data from the electronic storage unit only for that portion of the stored data being older than the expiry date.

The expiry date may be a moving date or moving time and may be defined by a time interval compared to the actual time. In this way it may be guaranteed and provided that data recently acquired and recently stored in the electronic storage unit may not become subject to a premature deletion or erasing of data. In this way it may be provided, that information about a rather recent discharging or expelling of an amount of a drug from the drug reservoir by the drug delivery system is and remains readable for the processing unit. Hence, in an emergency situation a person such as medical staff is given the possibility to read out at least recently stored data from the electronic storage unit. This may help to identify or to classify a momentary emergency situation of a patient.

According to a further example the electronic circuit further comprises an end-of-life identifying unit. The end-of-life identifying unit is operable to determine and/or to indicate an end-of-life of at least one of the capturing system and the drug delivery system. The end-of-life identifying unit may be implemented in many different ways. With the end-of-life identifying unit, a point of time may be automatically or autonomously identified after which the electronically-controlled capturing system or the drug delivery system should no longer be used and should become discarded. The end-of-life identifying unit enables an automated determination of an end-of-life of the capturing system and/or of the associated drug delivery system or drug delivery device. Once the end-of-life situation has been identified or indicated the data reading disabling unit may be switched into the activated state. By means of the end-of-life identifying unit the end-of-life configuration may be identified. This may be help or may be used as a trigger to activate the data reading disabling unit and to persistently disable or to prevent readout or providing of stored data from the electronic storage unit.

The end-of-life identifying unit may be operably connected to at least one of the data reading disabling unit, the processing unit, the electronic storage unit and the electric energy unit. With some examples the end-of-life identifying unit is limited to indicate an end-of-life configuration of the drug delivery device. A user may then become aware of the end-of-life configuration and may decide to manually activate the data reading disabling unit before discarding the electronically-controlled capturing system. With other examples, the end-of-life identifying unit is operably connected to the data reading disabling unit in such a way that the end-of-life identifying unit is operable and/or configured to switch the data reading disabling unit into the activated state upon detection or determination of the end-of-life configuration. But also here, switching of the data reading disabling unit into the activated state may require a further user interaction. For instance, the end-of-life identifying unit may be configured to communicate with the user of the electronically-controlled capturing system and may require a confirmation from the user, that the data reading disabling unit is automatically activated or triggered by the end-of-life identifying unit.

According to another example, the end-of-life identifying unit is operably connected to the data reading disabling unit. The end-of-life identifying unit is operable to set the data reading disabling unit in the activated state. The end-of-life identifying unit may be operable to switch the data reading disabling unit into the activated state. The end-of-life identifying unit may be particularly implemented to automatically switch the data reading disabling unit into the activated state, thereby persistently preventing at least one of readout of stored data from the electronic storage unit or providing of stored data from the electronic storage unit.

According to a further example, the end-of-life identifying unit is operable to determine an available amount of electric energy of the electric energy unit. The end-of-life identifying unit is further operable to compare the determined or available amount of electric energy with a predefined minimum amount of electric energy of the electric energy unit. In other words the end-of-life identifying unit is operable to autonomously detect or to determine an available or residual amount of electric power or electric energy of the electric energy unit. By comparing the available or residual amount of electric energy with a predefined minimum amount the end-of-life identifying unit may be operable to indicate to at least one of the processing unit, the electronic storage unit or the data reading disabling unit, that the capturing system and/or the electric energy unit approaches a state of insufficient electric power or insufficient electric energy.

For instance, the predefined minimum amount of electric energy may reflect a minimum amount of electric energy required to start or to conduct a writing or erase procedure of the electronic storage unit. Here, the end-of-life identifying unit may be operable to trigger at least one of the processing unit and the data reading disabling unit to initiate and/or to conduct a delete or erase operation of the stored data in the electronic storage. By determining the available or residual amount of electric energy of the electric energy unit an uncontrolled loss of electric power may be avoided. In this way and before the capturing system falls short of electric power or electric energy the data reading disabling unit may be autonomously switched into the activated state in order to prevent readout of the stored data or to provide the stored data from the electronic storage unit.

As long as the comparison of the available amount of electric energy with the predefined minimum amount of electric energy reveals that the available or residual power is larger than the predefined minimum amount of electric energy the capturing system may operate in a usual manner to acquire and to store data in the electronic storage unit.

However, and when the comparison of the available or residual amount of electric energy with the predefined minimum amount of electric energy reveals that the capturing system is running out of electric power or electric energy, at least one of the end-of-life identifying unit, the processing unit and the data reading disabling unit may autonomously trigger an end-of-lifecycle routine. The end-of-lifecycle routine may be configured in numerous different ways. With one example, the end-of-lifecycle routine may be programmed in the processing unit or in the data reading disabling unit. The end-of-lifecycle routine may define numerous steps that have to be conducted or performed when the capturing system reaches an end-of-life configuration.

With some examples the end-of-lifecycle routine may comprise initiating a backup of the stored data from the electronic storage unit. Here, the processing unit may autonomously trigger a transmission of the acquired and/or stored data from the electronic storage unit to an external electronic device. For this, the electronic storage unit may be operable to establish a communication link to a transmission interface or to establish a communication link between the transmission interface of the capturing system with a counter-transmission interface of the external electronic device. When the data backup procedure has been completed the end-of-lifecycle routine may comprise the further step of erasing the stored data in the electronic storage unit.

With other examples, the end-of-lifecycle routine may comprise steps of irreversibly disconnecting the processing unit from at least one of the electric energy unit and the electronic storage unit. With other examples the end-of-lifecycle routine comprises the step of disconnecting the electric energy unit from at least one of the processing unit and the electronic storage unit. With other examples, the end-of-lifecycle routine comprises the step of irreversibly depleting electric power or electric energy from the electric energy unit. With further examples, the end-of-lifecycle routine is operable to trigger an irreversible encryption of acquired data or of stored data in the electronic storage unit. With further examples the end-of-lifecycle routine comprises a step of irreversibly preventing decryption of stored data, which is stored in the electronic storage unit in an encrypted format. In effect, the end-of-lifecycle routine may comprise or provide any of the above mentioned means to prevent at least one of readout of stored data from the electronic storage unit or to prevent providing of stored data from the electronic storage unit.

According to a further example, the end-of-life identifying unit comprises a counter operable to determine at least one of a number of uses of the drug delivery system, a time since one of the drug delivery system and the capturing system has been used for the first time and a number of replaceable drug containers used with the drug delivery system. The counter and/or the end-of-life identifying unit may be integrated into the processing unit of the capturing system. The number of uses of the drug delivery system, a time since one of the drug delivery system and the capturing system has been used for the first time and/or a number of replaceable drug containers used with the drug delivery system may be derived from the data acquired by the processing unit during the intended use of the capturing system in combination with the drug delivery system.

Moreover, the counter may be actuatable by a user of the capturing system and/or by a user of the drug delivery system. Here, the counter and/or the end-of-life identifying unit may be provided with a predefined maximum number of uses of the drug delivery system, a maximum time since one of the drug delivery system and the capturing system has been used for the first time and a maximum number of replaceable drug containers used with the drug delivery system. If the determined number or the determined time approaches, is equal to or exceeds the predefined maximum number or predefined maximum time the end-of-life identifying unit may be operable to indicate that an end-of-lifecycle configuration of the capturing system and/or of the drug delivery system and/or of the drug container used with the drug delivery system has been reached. The end-of-life identifying unit may indicate this end-of-lifecycle situation to a user of the capturing system and/or to a user of the drug delivery system. The end-of-lifecycle configuration identified by the end-of-life identifying unit in this particular way may further autonomously trigger at least one of the processing unit and the data reading disabling unit to switch the data reading disabling unit into the activated state thereby persistently preventing at least one of readout of stored data and/or providing of stored data from the electronic storage unit.

Once the counter has determined a number of uses of the drug delivery system approaching, being equal or exceeding the predefined maximum number of uses of the drug delivery system the end-of-life identifying unit and/or the processing unit may be operable to trigger or to conduct the above described end-of-lifecycle routine. The same applied when the counter determines that the time since one of the drug delivery system and the capturing system has been used for the first time approaches, is equal to or exceeds the predefined maximum time since one of the drug delivery system and the capturing system has been used for the first time.

Correspondingly, at least one of the end-of-life identifying unit, the processing unit and the data reading disabling unit may be configured to initiate or to trigger the end-of-lifecycle routine when the determined number of replaceable drug containers used with the drug delivery system approaches, is equal to or exceeds a predefined maximum number of replaceable drug containers used with the drug delivery system.

According to a further example, the end-of-life identifying unit is operably connected to at least one sensor. The at least one sensor is operable to determine at least one of a temperature, a pressure, a humidity, a motion, an orientation, a presence and/or an intensity of electromagnetic radiation and an integrity of the drug delivery system. In this way, the sensor may comprise or may be implemented as a temperature sensor, a pressure sensor, a humidity sensor, a motion or acceleration sensor, an orientation sensor, a light detecting sensor or an integrity sensor of the drug delivery system. The end-of-life identifying unit is further operable to process signals provided from the at least one sensor. The sensor provides sensor signals being processed by the end-of-life identifying unit to generate sensor data. At least one of the data reading disabling unit, the processing unit and the end-of-life identifying unit may be operable to compare the sensor data provided and/or processed by the end-of-life identifying unit with predefined sensor data, e.g., defining environmental or ambient conditions in which the drug delivery system should be used.

In situations, in which the drug delivery system is for instance used or stored in a non-compliant ambience or surrounding, e.g., when the drug delivery system is kept at an elevated temperature over a maximum allowable time interval the drug contained in the reservoir may deteriorate and should no longer be used. By means of the at least one sensor, such non-compliant ambient conditions may be detected. If detected that environmental conditions no longer match with predefined ambient conditions the end-of-life identifying unit may indicate to a user of the capturing system or of the drug delivery system that the drug provided in the drug reservoir should no longer be used and that, e.g., the entire drug delivery system should be discarded. This applies particularly for examples, wherein the drug delivery system is a disposable drug delivery system and/or wherein the capturing system is integrated into the drug delivery system. In such situations, the end-of-life identifying unit may be operable to trigger at least one of the processing unit and the data reading disabling unit to switch the data reading disabling unit into the activated state.

The at least one sensor may be implemented as an environmental sensor. Examples of environmental sensors used with drug delivery systems, such as injection devices is for instance disclosed in WO2016/115372 A1, the disclosure of which being herein incorporated by reference.

According to a further example the end-of-life identifying unit comprises a controller being operable to detect user-initiated operations of the drug delivery system, wherein such user-initiated operations include dispensing of a dose of a drug. The controller is further operable to record the user-initiated operations over time. The controller is further operable to estimate, based on recorded user-initiated operations, a dosing regimen for the drug including at least one of a periodicity and a time or time window for the user-initiated operations of the drug delivery system. The controller is further operable to determine a non-compliance of a use of the drug delivery system with the estimated dosing regimen. Hence, the controller may be pre-programmed or may be provided with a predefined medication schedule.

The controller is further operable to detect and to record user-initiated operations of the drug delivery system over time. In this way, the controller is operable to estimate a compliance or non-compliance of the actual use of the drug delivery system with the predefined medication or prescription schedule. When the controller has determined a non-compliance of a use of the drug delivery system this may be an indication, that the user has lost access to the drug delivery system and/or to the capturing system. Detection of a non-compliance with the estimated dosing regimen may autonomously trigger an end-of-lifecycle routine as described above and/or to trigger switching of the data reading disabling unit into the activated state. Detection or determination of a non-compliance may be an indication that the user is no longer using the drug delivery system and/or the capturing system. In order to prevent misuse of the stored data of the electronic storage unit, the determination or detection of a non-compliance of use of the drug delivery system with the estimated dosing regimen may therefore autonomously trigger switching of the data reading disabling unit into the activated state, thereby persistently preventing at least one of readout of stored data or providing of stored data from the electric energy unit.

Some examples of how to determine a non-compliance of a use of the drug delivery system with the estimated dosing regimen that are implemented here are described in document EP2729202 B1, the disclosure of which being herein incorporated by reference.

According to a further example, the controller of the end-of-life identifying unit is integrated into the processing unit. Here, the processing unit may comprise the controller of the end-of-life identifying unit. Also, the entire end-of-life identifying unit may be integrated into the processing unit of the electronic circuit of the electronically-controlled capturing system. The controller of the end-of-life identifying unit may be a logical unit or a logic module of the processing unit. The end-of-life identifying unit and/or the controller thereof may be integrated into a hardware component of the processing unit. In this way, production costs and expenditure for providing the hardware components of the electronic circuit may be kept at a rather low level, thus enabling the implementation of the electronic circuit in a disposable electronically-controlled capturing system.

According to a further example, the end-of-life identifying unit comprises a data exchange detector. The data exchange detector is operable to detect and/or to record over time establishing of a data communication between the capturing system and an external electronic device. The data exchange detector may be integrated into the controller of the end-of-life identifying unit. Consequently, the data exchange detector may also be integrated into the processing unit of the electronic circuit. By means of the data exchange detector, a regular data communication between the capturing system and an external electronic device may be monitored and surveyed. The data exchange detector may estimate, based on detected user-initiated operations a data exchanging regimen for the capturing system and the external electronic device. Based on the periodicity and/or based on predefined data exchanging routines or procedures an estimated or a predefined data exchanging regimen may be provided.

With the data exchange detector, compliance or non-compliance of data exchange with the estimated data exchange regimen may be detected. In this way and in case of a detection of a non-compliance of a data communication between the capturing system and an external electronic device with an estimated or predefined data exchanging regimen the end-of-life identifying unit may be operable to trigger at least one of the processing unit and the data reading disabling unit to switch the data reading disabling unit into the activated state. The external electronic device may be implemented as a mobile electronic device provided with a counter transmission interface operable to establish a communication link with the transmission interface of the capturing system.

The external electronic device may comprise a smartphone, a smart watch, a blood glucose measuring device and/or a wired or wireless data exchange environment. In a typical scenario of use, the data exchange detector and/or the end-of-life identifying unit may be regularly paired with selected or predefined external electronic devices. The data exchange detector and/or the end-of-life identifying unit may be programmed to regularly request or to regularly establish a communication link with at least one of previously determined or detected external electronic devices. In situations, in which such external electronic devices are not available over a predefined time interval, e.g., over a number of hours, a number of days or a number of weeks this may be an indication, that the capturing system is no longer used in an entrusted data exchanging environment. Such a situation may be autonomously identified by the data exchanging detector as a non-compliance with a data exchanging regimen. In response to the detection of non-compliance the data exchange detector may be operable to trigger at least one of the processing unit and the data reading disabling unit to initiate and/or to conduct switching of the data reading disabling unit into the activated state.

According to a further example the end-of-life identifying unit is integrated into the processing unit. Hence, the end-of-life identifying unit and the processing unit are provided by one and the same hardware component. Typically, the electronic circuit comprises a microprocessor. The end-of-life identifying unit and the processing unit are both integrated in the microprocessor. The processing unit and the end-of-life identifying unit are separate logical blocks of the microprocessor.

According to a further example, the processing unit is provided by a microprocessor. Alternatively, the processing unit is implemented in the microprocessor. The microprocessor may comprise at least one or several microcontrollers. The microprocessor may comprise a field programmable gate array (FPGA).

According to a further example, the microprocessor is configured to set the data reading disabling unit into the activated state. Here, switching of the data reading disabling unit into the activated state may be conducted and triggered by the microprocessor. In this way, switching of the data reading disabling unit into the activated state may be conducted by electronic signal processing provided by the microprocessor. Switching of the data reading disabling unit into the activated state may be exclusively implemented by software. A software command initiated by actuation through the user or autonomously initiated by the processing unit and/or by the end-of-life identifying unit may lead to the activation of the data reading disabling unit. In this way and when the capturing system is equipped with a suitable transmission interface the data reading disabling unit may be switched into the activated state even via a remote data connection. So in situations in which the capturing system and/or the drug delivery system equipped with the capturing system should get lost and in situations in which a user of the respective system has no longer physical access to at least one of the drug delivery system and the capturing system the data reading disabling unit may be activated via a remote data link or data communication via the transmission interface and the processing unit.

When the microprocessor is configured to set the data reading disabling unit into the activated state, the microprocessor and the data reading disabling unit may be provided as separate hardware components. Here and for instance the data reading disabling unit may be implemented to discharge or to deplete electric energy or electric power from the electric energy unit. The data reading disabling unit may be provided as a separate controller or as an electronically activatable switch separated from the microprocessor but controllable by the microprocessor. With other examples, the data reading disabling unit may be operable to detune a transmission interface of the capturing system when activated. Such detuning may also be provided by a separate electronically controllable switch.

According to some further examples, the data reading disabling unit is integrated into the microprocessor. Here, the microprocessor itself is operable to persistently prevent at least one of readout of stored data from the electronic storage unit or to persistently prevent providing of stored data from the electronic storage unit. This may particularly apply to examples of the capturing system, wherein the data reading disabling unit and hence the processing unit is or are operable to erase or to override stored data in the electronic storage unit. With other examples and when the data reading disabling unit is integrated into the microprocessor the microprocessor may be irreversibly switchable into a state, in which readout of data from the electronic storage unit is prevented.

According to a further example, the data reading disabling unit comprises at least one of an electronic switch and a mechanical switch. Each one of the electronic switch and the mechanical switch is operable to activate the data reading disabling unit. Hence by means of the at least one electronic switch and/or the at least one mechanical switch the data reading disabling unit is switchable into the activated state. The switch, i.e. the electronic switch and/or the mechanical switch may be implemented to irreversibly erase stored data in the electronic storage unit. The switch may be operable to trigger the processing unit to initiate or to conduct a delete or erase operation of the stored data in the electronic storage unit. The switch may be user actuatable. In this way the user may initiate and/or conduct a data erase operation at his own discretion.

The switch may be actuatable by the processing unit. Hence, activation of the switch may be controlled by software and/or by software commands executed by the processing unit. The switch, i.e. the at least one of an electronic switch and a mechanical switch may also be operable to disconnect the processing unit from the electric energy unit and/or to disconnect the electric energy unit from any of the processing unit and the electronic storage unit when actuated. Moreover, the switch may be implemented to disconnect the electronic storage unit from the processing unit or vice versa. Any disconnection of an electronic or electric connection between any of the electric energy unit, the processing unit and the electronic storage unit may be of irreversible type. Once an electronic or electric connection between one of the electric energy unit, the processing unit and the electronic storage unit with another one of the processing unit, the electronic storage unit and the electric energy unit is disconnected, this disconnected connection may not be re-established or reconnected.

In a further aspect, the disclosure relates to a data capturing device configured for attachment to a drug delivery system. The data capturing device is operable to collect data being indicative of an amount of a drug expelled or discharged from a drug container of the drug delivery system. The data capturing device comprises a housing and a capturing system as described above. The capturing system is arranged inside the housing or it is integrated into the housing.

With some examples, the housing of the data capturing device is attachable and/or fixable to a housing of the drug delivery system. The housing of the data capturing device may also be integrated into the housing of the drug delivery system. The entire data capturing device may be implemented as a component or as a unit integrated into the drug delivery system. Both or at least one of the data capturing device and the drug delivery system may be implemented or configured as a disposable device or system, respectively. Hence, when an end-of-lifecycle of the data capturing device and/or of the drug delivery system has been reached the respective device or system is intended to be discarded in its entirety. Before or during discarding the data reading disabling unit of the capturing system is to be activated, Activation of the data reading disabling unit may be triggered by direct or remote interaction with a user or autonomously, in particular when an end-of-life configuration of the electronically-controlled capturing system or of the respective drug delivery system has been detected or determined.

According to a further aspect, the disclosure also relates to a drug delivery system for expelling or discharging of an amount of a liquid drug. The drug delivery system comprises a housing configured to accommodate a drug container filled with the liquid drug. The drug delivery system also comprises a drive mechanism operable to expel or to discharge the amount of the drug from the drug container. The drug delivery system further comprises a capturing system as described above. Here, the capturing system is disposed inside or on the housing. The capturing system may be integrated into the drug delivery system. Moreover, the capturing system may be integrated into the drug delivery device. The drug delivery device may comprise an injection or infusion device or may be implemented as an injection or as an infusion device. The drug delivery system may comprise an injection pen configured for subcutaneous injection of a liquid medicament. When implemented as an injection pen the drug delivery device, in particular the drug mechanism of the drug delivery device comprises a piston rod or a plunger rod configured to advance in a distal, hence in a dose dispensing direction to exert thrust on a piston of a cartridge-like drug container for expelling of an amount, e.g., a dose of the medicament via a distal outlet of the drug container.

When implemented as an infusion device, the drive mechanism may comprise a pump configured to withdraw or to expel a predefined amount, e.g., a dose of the drug or medicament from the drug container, e.g., by way of suction. Here, the pump may comprise a peristaltic pump or the like pumping mechanisms.

With a further example, the drug delivery system further comprises a drug container filled with the drug and disposed inside the housing. The drug delivery system and/or the respective drug delivery device may be configured or implemented as a prefilled drug delivery system or drug delivery device with the drug container readily assembled therein. Such prefilled drug delivery systems or drug delivery devices, in particular prefilled drug injection devices may be implemented as disposable systems or as disposable devices intended to be discarded in their entirety when the drug provided in the drug container has been used up or should no longer be used.

According to another aspect, the present disclosure relates to a method of disabling readout or providing of data from an electronic storage unit of a data capturing system as described above. The method comprises the step of setting of the data reading disabling unit into the activated state and persistently preventing at least one of: readout of data from the electronic storage unit or providing of data from the electronic storage unit.

The method of disabling readout or providing of data is implementable by the above described electronically-controlled capturing system. Insofar any features, benefits and effects described above in connection with the electronically-controlled capturing system equally apply to the method of disabling readout or providing of data from the electronic storage unit; and vice versa.

According to another aspect, the disclosure also relates to a method of disabling readout or providing of data from an electronically-controlled capturing system. The capturing system is operable to capture data in an electronic storage unit. The data representing an amount of a drug expelled or discharged from a drug reservoir by a drug delivery system. The method comprises the steps of detecting of an end-of-life of at least one of the drug delivery system and the capturing system. The method further comprises the step of activating a data reading disabling unit of the capturing system in response to the detection of the end-of-life and the method further comprises the step of persistently preventing at least one of readout of data from the electronic storage unit or providing of data from the electronic storage unit. Typically, this method is also configured to be carried out by an electronically-controlled capturing system as described above. Insofar any features, benefits and effects described above in connection with the electronically-controlled capturing system equally apply to the method of disabling readout or providing of data from the electronic storage unit; and vice versa.

With any method of disabling readout or providing of data setting of the data reading disabling unit into the activated state or activating the data reading disabling unit is irreversible. Once the data reading disabling unit has been activated it may not be deactivated or a deactivation of the data reading disabling unit has no resurrecting effect on the stored data provided in the electronic storage unit.

Generally, the scope of the present disclosure is defined by the content of the claims. The injection device is not limited to specific embodiments or examples but comprises any combination of elements of different embodiments or examples. Insofar, the present disclosure covers any combination of claims and any technically feasible combination of the features disclosed in connection with different examples or embodiments.

In the present context the term 'distal' or 'distal end' relates to an end of the injection device that faces towards an injection site of a person or of an animal. The term 'proximal' or 'proximal end' relates to an opposite end of the injection device, which is furthest away from an injection site of a person or of an animal.

The term "drug" or "medicament", as used herein, means a pharmaceutical formulation containing at least one pharmaceutically active compound, wherein in one embodiment the pharmaceutically active compound has a molecular weight up to 1500 Da and/or is a peptide, a proteine, a polysaccharide, a vaccine, a DNA, a RNA, an enzyme, an antibody or a fragment thereof, a hormone or an oligonucleotide, or a mixture of the above-mentioned pharmaceutically active compound, wherein in a further embodiment the pharmaceutically active compound is useful for the treatment and/or prophylaxis of diabetes mellitus or complications associated with diabetes mellitus such as diabetic retinopathy, thromboembolism disorders such as deep vein or pulmonary thromboembolism, acute coronary syndrome (ACS), angina, myocardial infarction, cancer, macular degeneration, inflammation, hay fever, atherosclerosis and/or rheumatoid arthritis, wherein in a further embodiment the pharmaceutically active compound comprises at least one peptide for the treatment and/or prophylaxis of diabetes mellitus or complications associated with diabetes mellitus such as diabetic retinopathy, wherein in a further embodiment the pharmaceutically active compound comprises at least one human insulin or a human insulin analogue or derivative, glucagon-like peptide (GLP-1) or an analogue or derivative thereof, or exendin-3 or exendin-4 or an analogue or derivative of exendin-3 or exendin-4.

Insulin analogues are for example Gly(A21), Arg(B31), Arg(B32) human insulin; Lys(B3), Glu(B29) human insulin; Lys(B28), Pro(B29) human insulin; Asp(B28) human insulin; human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Insulin derivates are for example B29-N-myristoyl-des (B30) human insulin; B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl- ThrB29LysB30 human insulin; B29-N—(N-palmitoyl-Y-glutamyl)-des(B30) human insulin; B29-N—(N-lithocholyl-Y-glutamyl)-des(B30) human insulin; B29-N-(ω-carboxyheptadecanoyl)-des(B30) human insulin and B29-N-(ω-carboxyheptadecanoyl) human insulin.

Exendin-4 for example means Exendin-4(1-39), a peptide of the sequence H-His-Gly-Glu-Gly-Thr-Phe-Thr-Ser-Asp-Leu-Ser-Lys-Gln-Met-Glu-Glu-Glu-Ala-Val-Arg-Leu-Phe-Ile-Glu-Trp-Leu-Lys-Asn-Gly-Gly-Pro-Ser-Ser-Gly-Ala-Pro-Pro-Pro-Ser-NH2.

Exendin-4 derivatives are for example selected from the following list of compounds:

H-(Lys)4-des Pro36, des Pro37 Exendin-4(1-39)-NH2,
H-(Lys)5-des Pro36, des Pro37 Exendin-4(1-39)-NH2,
des Pro36 Exendin-4(1-39),
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4(1-39); or
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4 (1-39),
wherein the group -Lys6-NH2 may be bound to the C-terminus of the Exendin-4 derivative;
or an Exendin-4 derivative of the sequence
des Pro36 Exendin-4(1-39)-Lys6-NH2 (AVE0010),
H-(Lys)6-des Pro36 [Asp28] Exendin-4(1-39)-Lys6-NH2,
des Asp28 Pro36, Pro37, Pro38Exendin-4(1-39)-NH2,
H-(Lys)6-des Pro36, Pro38 [Asp28] Exendin-4(1-39)-NH2,
H-Asn-(Glu)5des Pro36, Pro37, Pro38 [Asp28] Exendin-4(1-39)-NH2,
des Pro36, Pro37, Pro38 [Asp28] Exendin-4(1-39)-(Lys)6-NH2,
H-(Lys)6-des Pro36, Pro37, Pro38 [Asp28] Exendin-4(1-39)-(Lys)6-NH2,
H-Asn-(Glu)5-des Pro36, Pro37, Pro38 [Asp28] Exendin-4(1-39)-(Lys)6-NH2,
H-(Lys)6-des Pro36 [Trp(O2)25, Asp28] Exendin-4(1-39)-Lys6-NH2,
H-des Asp28 Pro36, Pro37, Pro38 [Trp(O2)25] Exendin-4(1-39)-NH2,
H-(Lys)6-des Pro36, Pro37, Pro38 [Trp(O2)25, Asp28] Exendin-4(1-39)-NH2,
H-Asn-(Glu)5-des Pro36, Pro37, Pro38 [Trp(O2)25, Asp28] Exendin-4(1-39)-NH2,
des Pro36, Pro37, Pro38 [Trp(O2)25, Asp28] Exendin-4 (1-39)-(Lys)6-NH2,
H-(Lys)6-des Pro36, Pro37, Pro38 [Trp(O2)25, Asp28] Exendin-4(1-39)-(Lys)6-NH2,
H-Asn-(Glu)5-des Pro36, Pro37, Pro38 [Trp(O2)25, Asp28] Exendin-4(1-39)-(Lys)6-NH2,
H-(Lys)6-des Pro36 [Met(O)14, Asp28] Exendin-4(1-39)-Lys6-NH2,
des Met(O)14 Asp28 Pro36, Pro37, Pro38 Exendin-4(1-39)-NH2,
H-(Lys)6-desPro36, Pro37, Pro38 [Met(O)14, Asp28] Exendin-4(1-39)-NH2,
H-Asn-(Glu)5-des Pro36, Pro37, Pro38 [Met(O)14, Asp28] Exendin-4(1-39)-NH2,
des Pro36, Pro37, Pro38 [Met(O)14, Asp28] Exendin-4 (1-39)-(Lys)6-NH2,
H-(Lys)6-des Pro36, Pro37, Pro38 [Met(O)14, Asp28] Exendin-4(1-39)-(Lys)6-NH2,
H-Asn-(Glu)5 des Pro36, Pro37, Pro38 [Met(O)14, Asp28] Exendin-4(1-39)-(Lys)6-NH2,
H-Lys6-des Pro36 [Met(O)14, Trp(O2)25, Asp28] Exendin-4(1-39)-Lys6-NH2,
H-des Asp28 Pro36, Pro37, Pro38 [Met(O)14, Trp(O2)25] Exendin-4(1-39)-NH2,
H-(Lys)6-des Pro36, Pro37, Pro38 [Met(O)14, Asp28] Exendin-4(1-39)-NH2,
H-Asn-(Glu)5-des Pro36, Pro37, Pro38 [Met(O)14, Trp (O2)25, Asp28] Exendin-4(1-39)-NH2,
des Pro36, Pro37, Pro38 [Met(O)14, Trp(O2)25, Asp28] Exendin-4(1-39)-(Lys)6-NH2,
H-(Lys)6-des Pro36, Pro37, Pro38 [Met(O)14, Trp(O2) 25, Asp28] Exendin-4(S1-39)-(Lys)6-NH2,
H-Asn-(Glu)5-des Pro36, Pro37, Pro38 [Met(O)14, Trp (O2)25, Asp28] Exendin-4(1-39)-(Lys)6-NH2;
or a pharmaceutically acceptable salt or solvate of any one of the afore-mentioned Exendin-4 derivative.

Hormones are for example hypophysis hormones or hypothalamus hormones or regulatory active peptides and their antagonists as listed in Rote Liste, ed. 2008, Chapter 50, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, Goserelin.

A polysaccharide is for example a glucosaminoglycane, a hyaluronic acid, a heparin, a low molecular weight heparin or an ultra low molecular weight heparin or a derivative thereof, or a sulphated, e.g., a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium.

Antibodies are globular plasma proteins (~150 kDa) that are also known as immunoglobulins which share a basic structure. As they have sugar chains added to amino acid residues, they are glycoproteins. The basic functional unit of each antibody is an immunoglobulin (Ig) monomer (containing only one Ig unit); secreted antibodies can also be dimeric with two Ig units as with IgA, tetrameric with four Ig units like teleost fish IgM, or pentameric with five Ig units, like mammalian IgM.

The Ig monomer is a "Y"-shaped molecule that consists of four polypeptide chains; two identical heavy chains and two identical light chains connected by disulfide bonds between cysteine residues. Each heavy chain is about 440 amino acids long; each light chain is about 220 amino acids long. Heavy and light chains each contain intrachain disulfide bonds which stabilize their folding. Each chain is composed of structural domains called Ig domains. These domains contain about 70-110 amino acids and are classified into different categories (for example, variable or V, and constant or C) according to their size and function. They have a characteristic immunoglobulin fold in which two β sheets create a "sandwich" shape, held together by interactions between conserved cysteines and other charged amino acids.

There are five types of mammalian Ig heavy chain denoted by α, δ, ε, γ, and μ. The type of heavy chain present defines the isotype of antibody; these chains are found in IgA, IgD, IgE, IgG, and IgM antibodies, respectively.

Distinct heavy chains differ in size and composition; α and γ contain approximately 450 amino acids and δ approximately 500 amino acids, while μ and ε have approximately 550 amino acids. Each heavy chain has two regions, the constant region ($C_H$) and the variable region ($V_H$). In one species, the constant region is essentially identical in all antibodies of the same isotype, but differs in antibodies of different isotypes. Heavy chains γ, α and δ have a constant region composed of three tandem Ig domains, and a hinge region for added flexibility; heavy chains μ and ε have a constant region composed of four immunoglobulin domains. The variable region of the heavy chain differs in antibodies produced by different B cells, but is the same for all antibodies produced by a single B cell or B cell clone. The variable region of each heavy chain is approximately 110 amino acids long and is composed of a single Ig domain.

In mammals, there are two types of immunoglobulin light chain denoted by λ and κ. A light chain has two successive domains: one constant domain (CL) and one variable domain (VL). The approximate length of a light chain is 211 to 217 amino acids. Each antibody contains two light chains that are always identical; only one type of light chain, κ or λ, is present per antibody in mammals.

Although the general structure of all antibodies is very similar, the unique property of a given antibody is determined by the variable (V) regions, as detailed above. More specifically, variable loops, three each the light (VL) and three on the heavy (VH) chain, are responsible for binding to the antigen, i.e. for its antigen specificity. These loops are referred to as the Complementarity Determining Regions (CDRs). Because CDRs from both VH and VL domains contribute to the antigen-binding site, it is the combination of the heavy and the light chains, and not either alone, that determines the final antigen specificity.

An "antibody fragment" contains at least one antigen binding fragment as defined above, and exhibits essentially the same function and specificity as the complete antibody of which the fragment is derived from. Limited proteolytic digestion with papain cleaves the Ig prototype into three fragments. Two identical amino terminal fragments, each containing one entire L chain and about half an H chain, are the antigen binding fragments (Fab). The third fragment, similar in size but containing the carboxyl terminal half of both heavy chains with their interchain disulfide bond, is the crystalizable fragment (Fc). The Fc contains carbohydrates, complement-binding, and FcR-binding sites. Limited pepsin digestion yields a single F(ab')2 fragment containing both Fab pieces and the hinge region, including the H—H interchain disulfide bond. F(ab')2 is divalent for antigen binding. The disulfide bond of F(ab')2 may be cleaved in order to obtain Fab'. Moreover, the variable regions of the heavy and light chains can be fused together to form a single chain variable fragment (scFv).

Pharmaceutically acceptable salts are for example acid addition salts and basic salts. Acid addition salts are e.g., HCl or HBr salts. Basic salts are e.g., salts having a cation selected from alkali or alkaline, e.g., Na+, or K+, or Ca2+, or an ammonium ion N+(R1)(R2)(R3)(R4), wherein R1 to R4 independently of each other mean: hydrogen, an optionally substituted C1-C6-alkyl group, an optionally substituted C2-C6-alkenyl group, an optionally substituted C6-C10-aryl group, or an optionally substituted C6-C10-heteroaryl group. Further examples of pharmaceutically acceptable salts are described in "Remington's Pharmaceutical Sciences" 17. ed. Alfonso R. Gennaro (Ed.), Mark Publishing Company, Easton, Pa., U.S.A., 1985 and in Encyclopedia of Pharmaceutical Technology.

Pharmaceutically acceptable solvates are for example hydrates.

It will be further apparent to those skilled in the art that various modifications and variations can be made to the present disclosure without departing from the scope of the disclosure. Further, it is to be noted, that any reference numerals used in the appended claims are not to be construed as limiting the scope of the disclosure.

BRIEF DESCRIPTION OF THE FIGURES

In the following, numerous examples of the injection device comprising a filling level indicator will be described in greater detail by making reference to the drawings, in which:

FIG. 6 is a block diagram of the general working principle of a data reading disabling unit, FIG. 7 is a block diagram of one example of an electronic device, FIG. 8 is a block diagram of one example of an electronic storage of the electronic device, FIG. 9 is a schematic illustration of the data stored in the electronic storage, FIG. 10 schematically illustrates one example of disabling data readout from the electronic storage, FIG. 11 schematically illustrates one example of disabling data readout from the electronic storage, FIG. 12 schematically illustrates another example of disabling data readout from the electronic storage, FIG. 13 schematically illustrates another example of disabling data readout from the electronic storage, FIG. 14 schematically illustrates another example of disabling data readout from the electronic storage.

DETAILED DESCRIPTION

Figure 1:
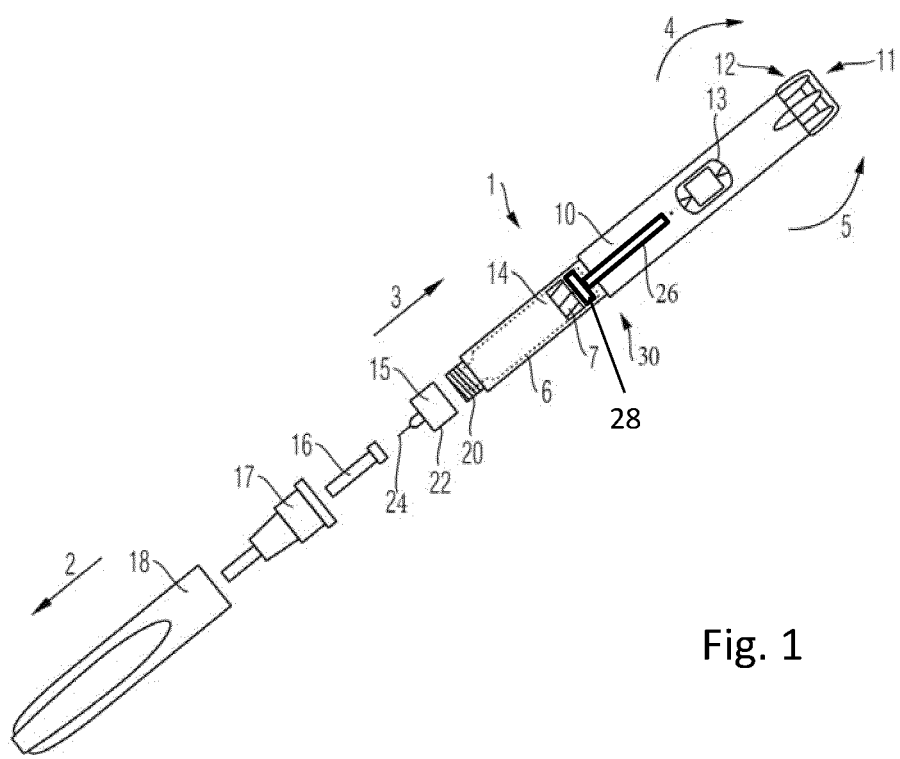
FIG. 1 shows an example of a drug delivery device.
Figure 2:
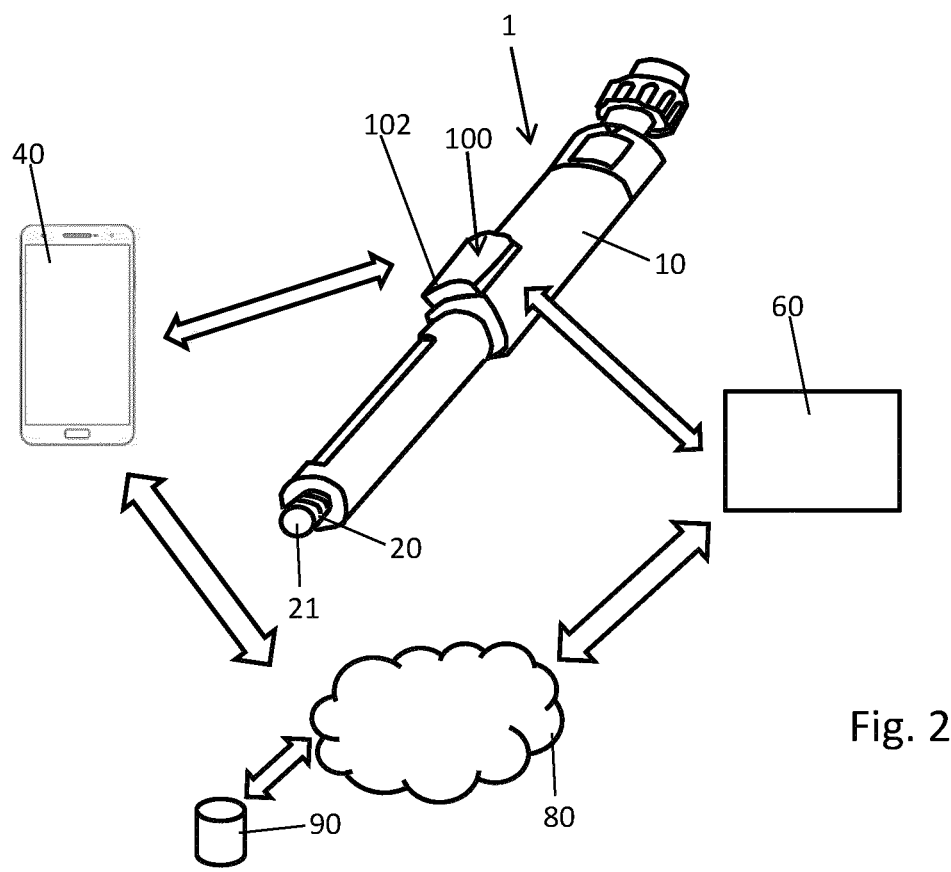
FIG. 2 shows an example of a drug delivery system comprising a drug delivery device and an electronic device

The injection device 1 as shown in FIGS. 1 and 2 can be implemented is a pre-filled disposable injection device that comprises a housing 10 to which a needle assembly 15 can be affixed. An injection needle 24 of the needle assembly 15 is protected by an inner needle cap 16 and either an outer needle cap 17 or a protective cap 18 that is configured to enclose and to protect a distal section of the housing 10 of the injection device 1. The housing 10 may comprise and form a main housing part configured to accommodate a drive mechanism 30. The injection device 1 may further comprise a distal housing component denoted as drug container holder 14. The drug container holder 14 may be permanently or releasably connected to the main housing 10. The drug container holder 14 is typically configured to accommodate a drug container 6 that is filled with a liquid medicament. The drug container 6 may comprise a cartridge that is sealed towards a distal end by a pierceable seal, such as a septum.

As further indicated in FIG. 1 the injection device 1 comprises a housing 10 and a container 6 filled with a liquid medicament. The container 6 provides a drug reservoir or medicament reservoir. It may comprise a substantially tubular-shaped barrel or bottle filled with the liquid medicament. Towards a proximal direction 3 the medicament reservoir 6 may be closed by a displaceable bung 7 or stopper. The bung 7 may be in mechanical contact with a piston rod 26 of the drive mechanism 30 configured for a stepwise or continuous distally directed displacement in order to urge the bung 7 further in distal direction 2 and hence towards a distal outlet of the medicament reservoir 6. At or near the outlet the medicament reservoir 6 may comprise a pierceable membrane. The needle assembly 15 comprises a threaded needle hub 22 configured for a screwed connection with the threaded socket 20 provided on a distal end of the drug container holder 14. As illustrated in FIG. 2, the very distal end of the drug container holder 14 comprises a through opening 21 to receive a proximal tipped section of the injection needle 24. In particular, the injection device needle 24 of the needle assembly 15 intersects the needle hub 22 and comprises a double-tipped cannula.

The drive mechanism 30 comprises the piston rod 26 operable to urge the bung in distal direction and to expel the medicament from the medicament reservoir 6, e.g., from a cartridge. A distal end of the piston rod 26 typically comprises a pressure piece 28 having a radially widened structure compared to the elongated piston rod 26. The pressure piece 28 is configured to get in direct mechanical contact with a proximal face of the bung 7 in order to displace the bung 7 relative to the sidewall of the medicament reservoir 6. The piston rod 26 may comprise a threaded rod that is in threaded engagement with the housing 10.

One example of a data capturing system 100 is illustrated in FIG. 2. The data capturing system 100 comprises a data capturing device 102. The structure and possible configurations of the data capturing device 102 is illustrated in more detail in FIGS. 3-14. The data capturing device 102 comprises a housing 101. The data capturing system 100 and/or the data capturing device 102 may be directly attachable and fixable to the housing 10 of the drug delivery system or drug delivery device 1. However, a mechanical fixing of the data capturing system 100 or data capturing device 102 to the drug delivery device 1 may not be necessary. It may be sufficient when the data capturing device 102 or the data capturing system 100 is connected to or is connectable to a drug delivery system or drug delivery device 1 via a transmission interface, e.g., a wireless transmission interface. In this way, the data capturing system 100 or the data capturing device 102 may acquire data 126 from the drug delivery system or drug delivery device 1, wherein the acquired data represents an amount of a drug expelled or discharged from the drug container 6.

With some examples, the data capturing device 102 is attachable and/or fixable to a housing 10, 14 of the drug delivery device 1. For this at least one of the housing 10, 14 of the drug delivery device 1 and the capturing device 102 comprises a fastener for releasably or non-releasably connecting and/or attaching the capturing device 102 to the drug delivery device 1.

The drug delivery device 1 comprises a dose dial 12 and a trigger 11. In the example as illustrated in FIG. 1 the dose dial 12 and the trigger 11 are provided at a proximal end of the housing 10. The injection device 1 further comprises a dosage window 13 in which a size of a dose of the medicament currently set is visually indicated. For setting of a dose the user simply rotates the dose dial 12 in a dose incrementing direction 4 relative to the housing 10. During setting of a dose consecutive increasing numbers will show up in the dosage window 13. If a dose currently set should be too high the user also has the possibility to decrease the size of a dose by dialing or rotating the dose dial 12 in the opposite, hence dose decrementing direction 5. Once a dose of appropriate size has been set or selected a dose dispensing procedure may be triggered or controlled by depressing of the trigger 11, e.g., forming a proximal end face of the injection device. The trigger 11 may be depressed by a thumb of a user.

As will be explained further below, in connection with FIG. 7 the data capturing system 100 and/or the data capturing device 102 comprises a data transmission interface 111. The data transmission interface 111 may be implemented to establish a communication link with at least one external electronic device 40, 60, 90 as indicated in FIG. 2. There, a data communication environment is schematically illustrated. By means of the data transmission interface 111 the data capturing device 102 may set up a wireless data transmission link to any of the external electronic devices 40, 60, 90. In the illustration of FIG. 2, the external electronic device 40 is implemented as a portable electronic device. It may be implemented as a smart watch, as a smartphone, as a tablet computer or the like portable electronic device operable to communicate with the data capturing device 102 in a wireless way. The further or alternative external electronic device 60 may be implemented as a non-portable or stationary external electronic device. It may be implemented as a router or as an access point providing a wireless network access.

Both, the external electronic device 40 and the external electronic device 60 may be configured to establish a further communication link to a network 80, e.g., to the internet and hence to a database 90. The database 90 may provide electronic storage space for patient- or treatment-related data. The database 90 may provide electronic storage space for data backup, in particular for data acquired and stored by the electronically-controlled capturing system. The wireless communication between the wireless transmission interface 111 and the external electronic devices 40, 60 may be based on one of a plurality of available wireless data transmission standards, such as Wi-Fi, NFC, RFID or Bluetooth. Typically, the wireless transmission of data between the data capturing device 102 and any of the external electronic devices 40, 60 is based on RF broadcasting technology.

In a typical scenario the data transmission interface 111 may be configured to communicate with the external electronic device 40 via a Bluetooth type wireless connection. It may communicate with the external electronic device 60 via a Wi-Fi wireless communication protocol. The communication link between the data transmission interface 111 and any one of the available external electronic devices 40, 60 may be of unidirectional type. It may also be of bidirectional type.

Figure 3:
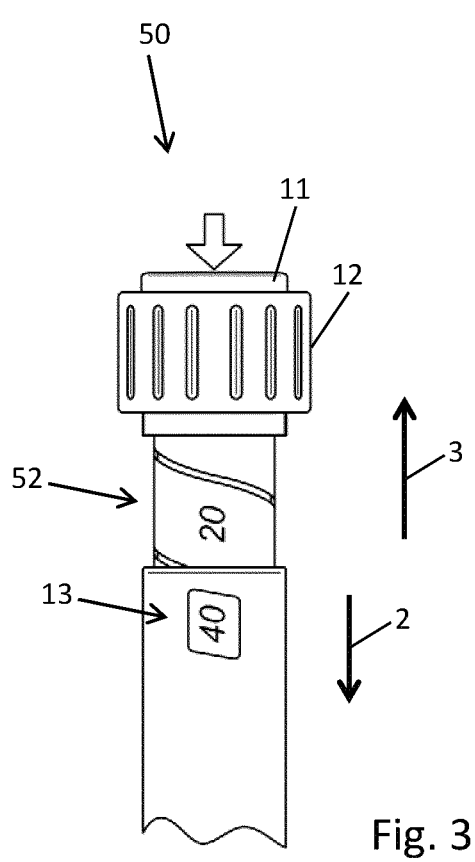
FIG. 3 is a detailed illustration of a proximal end of the drug delivery device.

Dose setting and dose dispensing of the drug delivery device is illustrated in greater detail with reference to FIG. 3. There, the dose dial 12 and the trigger 11 are a part of a dial extension 50. During and/or for setting of a dose rotating of the dose dial 12 leads to a longitudinal displacement of the dial extension 50 in proximal direction 3 relative to the housing 10. During dispensing of a dose and when depressing the trigger 11 in distal direction 2 the dial extension 50 is subject to a longitudinal displacement in distal direction 2 until it reaches an initial configuration as indicated in FIG. 1. The dial extension 50 may further comprise a dose dial sleeve 52 comprising numerous numbers of symbols on an outside surface. Such numbers or symbols as indicated in FIG. 3 will show up in the dosage window 13 during setting and/or during dispensing of a dose.

Figure 4:
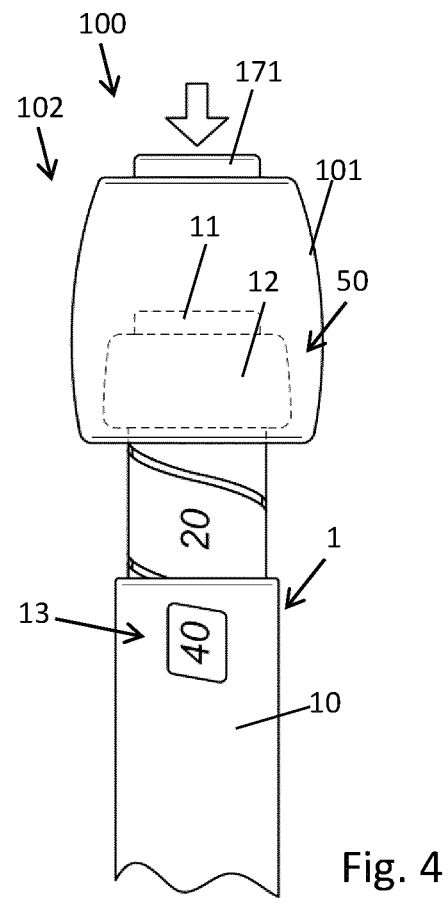
FIG. 4 is a detailed illustration of the proximal end of the drug delivery device with an electronic device attached thereto.

In FIG. 4, another example of a data capturing system 100 and a data capturing device 102 is given. Here, the data capturing device 102 comprises a housing 101 attachable to the dose dial extension 50 of the drug delivery device 1. The data capturing device 102 comprises a trigger 171 operably connected or operably connectable to the trigger 11 of the drug delivery device 1. The housing 101 of the data capturing device 102 as illustrated in FIG. 4 is fixable and attachable to the dose dial 12 of the drug delivery device. The housing 101 is connected to the dose dial 12 in a torque transmitting, hence in a slip-free way. Hence, rotating of the housing 101 relative to the housing 10 leads to a respective rotation of the dose dial 12 relative to the housing 10. Depending on the specific implementation of the drive mechanism 30 the dose dial 12 may be subject to a combined longitudinal and rotational movement relative to the housing 10 during setting and/or dispensing of a dose. With other implementations of the drive mechanism 30, the dose dial 12 is axially or longitudinally fixed to the housing 10. For and during setting of a dose the dose dial 12 is exclusively subject to a rotational motion relative to the housing 10 while it remains axially fixed to the housing 10.

Figure 5:
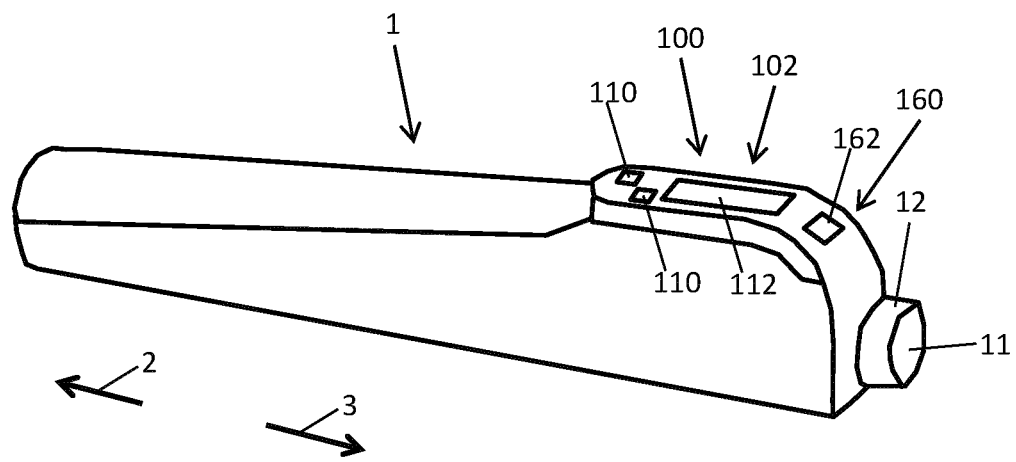
FIG. 5 shows another example of a drug delivery device with an integrated electronic device.

In FIG. 5, another example of a data capturing system 100 and a data capturing device 102 is illustrated. Here, the data capturing device 102 and the data capturing system 100 is or are integrated into a housing 10 of a drug delivery device 1. Also here, the drug delivery device 1 is implemented as a handheld and portable injection device. The drug delivery device 1 is electronically or electromechanically implemented. The drug delivery device 1 may comprise an electric drive operable to displace the piston rod 26 in a distal direction 2 for and during dose dispensing.

The data capturing device 102 is integrated into the drug delivery device 1. The data capturing device 102 and/or the drug delivery device comprises a visual output 112 that may be implemented as a display. The data capturing device 102 and/or the drug delivery device 1 further comprises at least one input 110, e.g., implemented as a button in order to control or to configure operation of the drug delivery device 1 and/or of the data capturing device 102.

With any implementation of the capturing system 100 and the data capturing device 102 as illustrated in FIGS. 1-5 the electronically-controlled capturing system 100 or the respective data capturing device 102 comprises an electronic circuit 108 as illustrated in FIG. 7. The electronic circuit 108 comprises an electric energy unit 116 comprising a reservoir of electric energy 117. The electronic circuit 108 further comprises a processing unit 114 operable by electric power obtained from the electric energy unit 116. The electronic circuit 108 further comprises an electronic storage unit 118 connected to the processing unit 114. The processing unit 114 is operable to acquire data 126, wherein the data 126 is representing an amount, e.g., a dose of a drug expelled or discharged from the drug reservoir 6 by the drug delivery system or the drug delivery device 1.

The processing unit 114 is operable to write acquired data 126 in the electronic storage unit 118. The processing unit 114 is further operable to read the stored data 126 from the electronic storage unit 118 and to provide the stored data 126 from the electronic storage unit 118. In order to provide the data 126 to an external electronic device 40, 60 the capturing system 100 as illustrated in FIG. 7 further comprises a data transmission interface 111. The capturing system 100 comprises at least one output 112. The output 112 may comprise a wireless data transmission antenna operable to set up or to establish a data communication link with at least one of the external electronic devices 40, 60 via a wireless communication protocol.

In this way and during a normal operation mode the electronically-controlled capturing system 100 is operable to repeatedly capture or to acquire data 126 and to store the respective data in the electronic storage unit 118. At regular time intervals and/or on request, the processing unit 114 is operable to read the data 126 from the electronic storage unit 118 and to make this data 126 available to at least one of the external electronic devices 40, 60, typically via the output 112 and/or via the data transmission interface 111.

The capturing system 100 and hence the capturing device 102 is further equipped with a data reading disabling unit 160. The data reading disabling unit 160 is operably connected to at least one of the processing unit 114, the electronic storage unit 118 and the electric energy unit 116. The data reading disabling unit is switchable into an activated state. In the activated state the data reading disabling unit 160 persistently prevents at least one of readout of stored data 126 from the electronic storage unit or providing of stored data 126 from the electronic storage unit 118. With typical examples the data reading disabling unit 160 is in a deactivated mode per default. It is irreversibly switchable from the deactivated state into the activated state. Hence, once activated it cannot be deactivated again or a deactivation has no resurrecting effect on the readout or the providing of the stored data 126.

With some examples the electric energy unit 116 is a finite source of electric energy. The electric energy unit may comprise one or several electric energy reservoirs 117. The electric energy reservoir 117 as indicated in FIG. 7 may comprise a battery cell or may consist of a battery cell. With some examples the electric energy unit 116 and/or the electric energy reservoir 117 is non-rechargeable and is not exchangeable. In this case and when the electric energy provided and stored in the electric energy unit 116 has dissipated or has been consumed the electronic circuit 108 and hence the processing unit 114 is or are no longer operable.

The electronic storage unit 118 is schematically illustrated in FIG. 8 in greater detail. The electronic storage unit 118 may comprise a volatile storage 140 and a non-volatile storage 142. Both, the volatile storage 140 and the non-volatile storage 142 may comprise numerous memory blocks. With other examples the electronic storage unit 118 only comprises a non-volatile storage 142 or only comprises a volatile storage 140.

The processing unit 114 typically comprises a clock generator 122 operable to provide a time or clock signal for assigning acquired data 126 with a time indication or timestamp. The clock generator 122 may be an integral component of the processing unit 114. The clock generator 122 may also be provided as a separate component remote from the processing unit 114.

The data reading disabling unit 160 is operably connectable to at least one of the processing unit 114, the electric energy unit 116 and the electronic storage unit 118. With some embodiments the data reading disabling unit 160 is connected to only one or two of the processing unit 114, the electronic storage unit 118 and the electric energy unit 116. With other examples the data reading disabling unit 160 is operably connected to a connection or to a data link between any two of the processing unit 114, the electronic storage unit 118 and the electric energy unit 116.

In either way the data reading disabling unit 160 is operable to modify, to reconfigure, to corrupt or to destroy the integrity and/or operability of at least one of the electric energy unit 116, the processing unit 114 and the electronic storage unit 118. In the same way the data reading disabling unit 160 may be operable to disconnect or to destroy a connection between any two of the processing unit 114, the electric energy unit 116 and the electronic storage unit 118.

As indicated in FIG. 6 the electric energy unit 116 is connected to the processing unit 114 by a supply connection 115. Electrical power or electric energy from the electric energy unit 116 is transferrable via the supply connection 115 to the processing unit 114. When appropriately connected to the electric energy unit 116 via the supply connection 115 the processing unit 114 is driven by electric energy provided by the electric energy unit 116.

The processing unit 114 is connected or coupled to the electronic storage unit 118 via a write data link 106 and via a read data link 103. Via the write data link 106 acquired data 126 provided to or processed by the processing unit 114 can be written in a suitable memory block of the electronic storage unit 118. Via the read data link 103 the stored data 126 can be read from the electronic storage unit 118.

The processing unit 114 is further provided with the data transmission interface 111. The data transmission interface 111 enables and provides any type of external communication between the processing unit 114 and any external electronic device 40, 60. For this the data transmission interface 111 provides a downlink data link 105 and an uplink data link 104. Via the downlink data link 105 data 126 acquired by a data acquisition system of the capturing system 100 or data 126 obtained from a dose size measuring sensor is provided to the processing unit 114. The data obtained via the downlink data link 105 can be processed by the processing unit 114 and can be stored in the electronic storage unit 118 via the write data link 106. In the opposite direction data 126 read from the electronic storage unit 118 and provided via the read data link 103 to the processing unit 114 can be transmitted via the data transmission interface 111 across and by means of the uplink data link 104.

In order to prevent misuse of stored data 126 stored in the electronic storage unit 118 at the end-of-lifecycle of the capturing system 100 and/or of the drug delivery system 1 the data reading disabling unit 160 provides at least one of numerous approaches to persistently prevent at least one of readout of stored data 126 on the electronic storage unit or providing of stored data from the electronic storage unit 118.

With one approach the data reading disabling unit 160 is operable to manipulate or to reconfigure the electric energy unit 116. Here, the data reading disabling unit 160 may be operable to prematurely discharge or to deplete electric energy from the electric energy unit. Here, the electric energy unit 116 is a finite electric energy reservoir. The electric energy unit 116 is non-rechargeable and is irreplaceably integrated into the electronic circuit. When the data reading disabling unit 160 has been activated it may deplete or discharge the electric energy unit 116. The capturing system 100 will then no longer have enough electrical power to readout data 126 from the electronic storage unit 118.

With another example the data reading disabling unit 160 is operable to disconnect or to corrupt the supply connection 115 between the electric energy unit 116 and the processing unit 114. Here, the processing unit 114 is void of an own energy supply. By irreversibly disconnecting and/or by irreversibly destroying the supply connection 115 the processing unit 114 is permanently shut down and cannot be set into an operation mode again. In this way readout of data 126 stored in the electronic storage unit 118 is persistently prevented.

With another example the data reading disabling unit 160 is operable to trigger or to reconfigure the processing unit 114. Hence, the data reading disabling unit 160 may be operable to switch the processing unit 114 into a data erase mode. When switched in the data erase mode the processing unit 114 may be operable to erase data 126 in the electronic storage unit 118. Here, the data may be overwritten by some further data or random data. Overwriting a memory cell or storage cell provides a persistent deletion of data 126 previously stored in the electronic storage unit 118.

In a further example the processing unit 114 is equipped with or comprises an encoder 124 or decoder. The encoder 124 is operable to encode or to encrypt the data 126 stored in the electronic storage unit 118. Hence, when triggered by the data reading disabling unit 160 the processing unit 114 may be operable to encrypt or to encode the data 126 stored in the electronic storage unit 118. Encryption may be conducted on the basis of a key. The key may be randomly generated by the processing unit 114. After completion of the data encryption the key may be deleted by the processing unit 114. Without the matching key the data 126 stored in the electronic storage unit 118 is non-decodable and cannot be decrypted. Even though the data 126 is still stored in the electronic storage unit 118 in an encrypted format it cannot be readout or made accessible.

With another example the processing unit 114 per default stores the acquired data 126 in the electronic storage unit 118 in an encrypted format only. For readout of the data 126 a decryption of the data is conducted by the processing unit 114 before the data 126 is transmitted via the output 112 to an external electronic device 40, 60. Here and when appropriately triggered by the data reading disabling unit, the processing unit 114 may be configured to delete a decoding or decryption key so that the data previously stored in the electronic storage unit 118 in an encrypted format cannot be decrypted any longer.

In this context and when the data stored in the electronic storage unit 118 is encrypted or will be encrypted when reaching the end-of-lifecycle a respective key 144 for encrypting or decrypting may be stored in the volatile storage 140 of the electronic storage unit 118. During normal operation and as long as the data reading disabling unit is in a deactivated state the processing unit 114 may read or acquire the key 144 from the volatile storage 140 in order to decode or to decrypt the stored data 126 when performing or conducting a data reading procedure. With this example and when the data reading disabling unit 160 is configured to deplete or to dissipate electric energy from the electric energy unit 116 and/or when the energy supply between the electric energy unit 116 and the electronic storage unit 118 is disconnected upon activation of the data reading disabling unit the key 144 provided in the volatile storage 140 is irreversibly lost. Consequently and even if someone should try to provide electric power to the processing unit 114 a decryption of the stored data 126 is no longer possible.

According to a further example the data reading disabling unit 160 is operable to erase or to override stored data 126 in the electronic storage unit 118. With a further example the data reading disabling unit 160 is operable to disconnect or to corrupt the read data link 103 by way of which stored data 126 can be transmitted from the electronic storage unit 118 to the processing unit 114. Here, the data reading disabling unit 160 may be configured to irreversibly disconnect or to irreversibly destroy the read data link 103. Since the electronic storage unit 118 is void of any further data links configured for extracting data from the storage a readout of the data stored in the electronic storage unit 118 is effectively prevented.

With other examples the data reading disabling unit 160 is operable to modify or to reconfigure, e.g., to detune the uplink data link 104 when switched into the activated state. In this way the processing unit 114 may remain enabled to readout the stored data 126 from the electronic storage unit 118 even when the data reading disabling unit has been switched into the activated state. However, the data 126 read by the processing unit 114 and made available to the processing unit 114 cannot be transmitted any further or any longer to any of the external electronic devices 40, 60. Here, the data reading disabling unit 160 may be operable to detune the data transmitting frequency or carrier frequency of the wireless communication link between the data transmission interface 111 and a respective counter-data transmission interface of one of the external electronic devices 40, 60.

In FIGS. 10-14 there are illustrated some examples of a data reading disabling unit 160 being operable to irreversibly switch into an activated state, in which data readout or transmission of stored data is persistently blocked or prevented.

Figure 10:
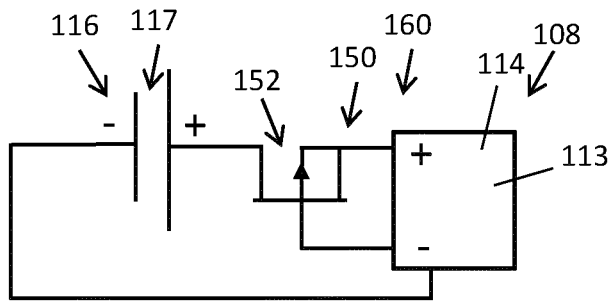

For the sake of simplicity only a few components of the electronic circuit 108 are illustrated in FIGS. 10-14. In the example of FIG. 10, the electric energy unit 116 is a finite reservoir of electric energy. It comprises a non-rechargeable battery. The processing unit 114 comprises a microprocessor 113 electrically connected to the electric energy unit 116 and driven by the electric energy unit 116. There is further provided a power management 150 comprising an electronic switch 152. The electronic switch may comprise one or several transistors, such as field effect or bipolar transistors, e.g., a MOSFET or JFET or FET transistor. The power management 150 may further comprise numerous discrete electronic components, such as resistors or capacitors that are not illustrated in greater detail here.

The electronic switch 152 may be switchable from a deactivated state into an activated state. In the deactivated state, the two input ports of the microprocessor 113 are electrically connected to the two ports or poles of the reservoir of electric energy 117. When the electronic switch 152 is switched into the activated state, the input ports of the microprocessor 113 are effectively disconnected from the electric energy unit 116 and hence from the reservoir of electric energy 117. Here, the data reading disabling unit 160 is switched into the activated state by switching the electronic switch 152 into the activated state.

The processing unit 114 and hence the microprocessor 113 are irreversibly disconnected from electrical power. Alternative to the electronic switch 152 there may also be implemented a mechanical switch 162 as indicated in FIG. 5. Both, the electronic switch 152 and/or the mechanical switch 162 may be manually actuatable by a user of the capturing system 100 in order to irreversibly disconnect the processing unit 114 from the electric energy unit 116.

Figure 11:
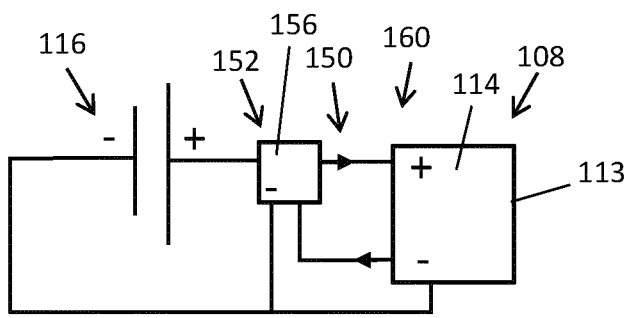

In the alternative example as illustrated in FIG. 11, the power management 150 comprises a power management integrated circuit 156 (power management IC) the power management IC may be switchable by respective output of the processing unit 114 and/or of the microprocessor 113. Hence, when the end-of-lifecycle has been reached or detected the processing unit 114 may trigger the power management IC 156 to persistently disconnect the processing unit 114 from the electric energy unit 116. The power management IC may comprise one of a DDS chip, a step-up converter, and step-down converter, a low-drop regulator, a buck converter, a boost converter or a current driver circuit.

Figure 12:
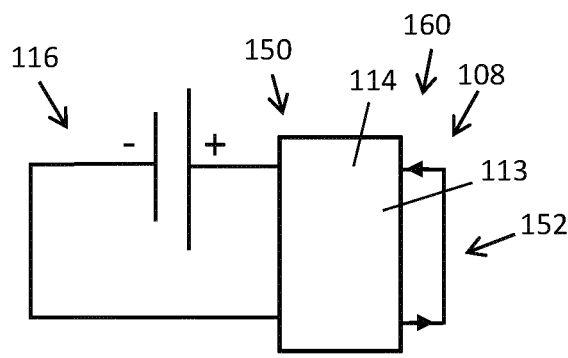

In the further example of a data reading disabling unit 160 as illustrated in FIG. 12 the processing unit 114 and/or the respective microprocessor 113 may be operable to switch off itself. Here, one or several output ports of the microprocessor 113 may be switched or activated at the end-of-lifecycle such that the processing unit 114 irreversibly enters an end-of-lifecycle mode, from which it cannot be resurrected. For instance, the microprocessor 113 may comprise a reset pin or an on/off pin by way of which the microprocessor 113 can be permanently switched off or irreversibly set into a sleep mode.

Figure 13:
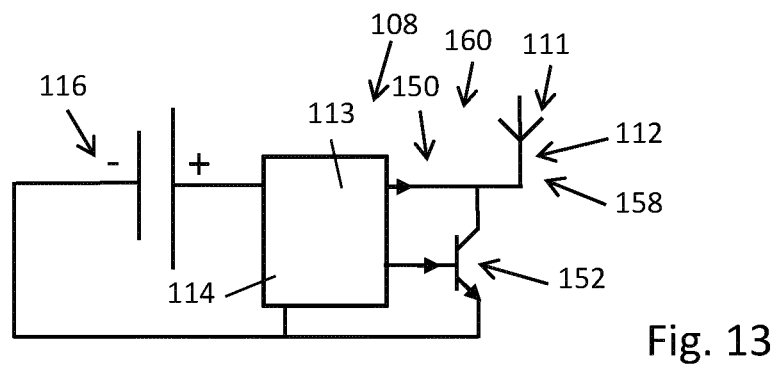

In a further example as illustrated in FIG. 13, the data reading disabling unit 160 is configured to detune or to modify the output 112 of the data transmission interface 111. For this and when the end-of-lifecycle has been reached, the data reading disabling unit 160 and/or the processing unit 114 may be operable to activate an electronic switch 152 by way of which the impedance of an antenna 158 can be permanently detuned or connected to ground. The antenna 158 may represent or provide at least one of the uplink data link 104 and a downlink data link 105. By irreversibly modifying the antenna 158 establishing of a wireless communication link with any external electronic device 40, 60 can be effectively prevented. The data 126 stored in the electronic storage unit 118 cannot be transmitted to any external electronic device 40, 60.

Figure 14:
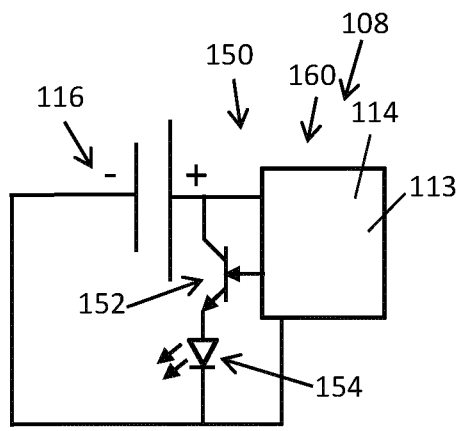

As a further example and as illustrated in FIG. 14 the data reading disabling unit 160 comprises an electric load 154, e.g., in form of an electrically operable light source, e.g., an LED. There is further provided an electronic switch 152 activatable through the processing unit 114 and/or by the microprocessor 113. Upon detection of the end-of-lifecycle or end-of-life configuration the data reading disabling unit 160, e.g., the processing unit 114 may be configured to switch on the electronic switch thereby producing a shortcut of the electric energy unit 116 via the electric load 154. Here, electric energy provided in the electric energy unit 116 is prematurely depleted or dissipated. The electronic circuit 108 is running out of electric power.

It should be noted, that any of the electronic switches 152 as illustrated in any of the FIGS. 10-14 may be either electronically implemented and may be switchable or actuatable by the microprocessor 113 and/or by the processing unit 114 itself. With all illustrated examples it is generally conceivable to replace the electronic switch 152 by a mechanical switch 162 actuatable by a user of the device. The mechanical switch 162 may be provided or equipped with a reuse preventer or reactivation preventer. Hence, when the mechanical switch has been actuated thereby switching the data reading disabling unit 160 into the activated state, a reverse switching of the data reading disabling unit from the activated state back into the deactivated state is not possible. The reuse preventer of the mechanical switch may comprise a perforated mechanical structure configured to irreversibly disintegrate upon actuation of the switch. Moreover, the mechanical switch 162 may comprise an irreversibly detachable flap or strap, which when detached or stripped off from the data capturing device 102 cannot be attached thereto again.

In FIG. 9 one example of a structure of the stored data 126 when stored in the electronic storage unit 118 is illustrated. There may be provided numerous memory blocks illustrated as rows with a consecutive number. For each row, a dosage or drug delivery information is provided. Each row is provided with a timestamp, e.g., generated by the clock generator 122 and the amount of the drug actually expelled or discharged from the drug reservoir 6. In the example of FIG. 9, dose sizes are given in integer numbers.

Each memory block is denoted with a number. For instance, memory block number 93 indicates, that an amount of 20 units of the medicament or drug has been administered at 8:03 in the morning. The subsequent storage block 94 indicates that an amount of 30 units has been administered in the evening at 20:05. The data 126 illustrated in FIG. 9 may be representative of a dosing regimen. Here, a patient may have to administer 20 units at 8:00 in the morning and 30 units of a drug at 20:00 in the evening every day. The data 126 may be entirely stored in non-volatile storage 142 of the electronic storage unit 118. It is also conceivable, that only some of the data 126 is stored in the non-volatile storage 142 whereas other data, e.g., non-recent or older data such as storage blocks 93, 94, 95 are stored in volatile storage 140. With such a configuration and when the data reading disabling unit 160 is operable to prematurely deplete electric power or to disconnect the electric energy unit 116 from the processing unit 114 and/or from the electronic storage unit 118 only the most recent data, e.g., the data in storage blocks 99, 98, 97, 96 can be readout in principle. In this way a care giver may always be provided with the possibility to obtain or to readout the most recent administering relevant data from the electronic storage unit 118. This might be useful in an emergency situation, wherein information about the actual or recent medication might be quite valuable and important.

The data 126 stored in the electronic storage unit 118 may be further analyzed to estimate a dosing regimen. For example and with the data illustrated in FIG. 9 the capturing system may be operable to determine or to estimate a dosing regimen, such as administering of 20 units at 8:00 in the morning and administering of 30 units at 20:00 in the evening. If now the data 126 acquired by the processing unit 114 should strongly deviate from the estimated dosing regimen this may be an indication that the capturing system and/or the drug delivery system is no longer in use, in particular, when a dosing action that is currently due is not performed or cannot be detected even after hours of the due date or due time. Such a determining of a non-compliance of use of the drug delivery system with the estimated or predefined dosing regimen may be used as a trigger that the end-of-life of the capturing system and/or of the drug delivery system 1 has been reached.

With numerous examples the capturing system 100 as illustrated in FIG. 7 is equipped with an end-of-life identifying unit 120. The end-of-life identifying unit is operable to determine and/or to indicate an end-of-life of at least one of the capturing system 100 and the drug delivery system. The end-of-life identifying unit 120 is operably connected to the data reading disabling unit 160. The end-of-life identifying unit 120 is operable to set the data reading disabling unit 160 into the activated state. In this way and once an end-of-life configuration of at least one of the drug delivery system 1 and the capturing system 100 has been detected or determined the data reading disabling unit 160 may be autonomously switched into the activated state by the end-of-life identifying unit 120 thereby preventing readout or providing of stored data 126 from the electronic storage unit 118.

The end-of-life identifying unit 120 may be optionally equipped with a sensor 130, such as an environmental sensor. The sensor 130 may be further operable to determine a filling level of the drug container 6. The sensor 130 may be further implemented to determine or to detect a momentary configuration of the drive mechanism 30 of the drug delivery system 1 or of the drug delivery device. In particular, the sensor 130 may be configured t determine an axial or longitudinal position of the piston rod 26 relative to the drug contain r 6 or relative to the housing 10.

Moreover, the sensor 130 may be implemented as an environmental sensor operable to determine at least one of a temperature, a pressure, a humidity, a motion, an orientation, a presence and/or intensity of electromagnetic radiation and an integrity of the drug delivery system or drug delivery device. For instance if the sensor 130 is operable to determine or to detect disassembly of the drug delivery device and when the drug del very device should be subject to a disassembly this may be detected by the detector 130. Accordingly, the end-of-life identifying unit 120 will appropriately detect that the device has been disassembled and that the end-of-lifecycle has been reached. Consequently, the end-of life identifying unit 120 is operable to switch the data reading disabling unit 160 into the activated state, thereby disabling readout or providing of data previously acquired and/or stored.

The end-of-life identifying unit 120 may optionally comprise a controller 132 and/or a data exchange detector 134. In this way, also numerous other schemes and situations being indicative of the reaching of an end-of-lifecycle can be implemented. By means of the controller 132 and the data exchange detector 134 the end-of-life identifying unit 120 is enabled to determine or to detect or to record over time establishing of a data communication between the data capturing system 100 and an external electronic device 40, 60. Here, a maximum amount of data exchanges may be set and/or stored in the end-of-life identifying unit 120. If a maximum allowable amount of data has been interchanged the end-of-life identifying unit 120 may be operable to set or to switch the data reading disabling unit 160 into the activated state.

Moreover and with further examples the end-of-life identifying unit 120 may comprise a counter 121. The counter 121 may be operable to determine at least one of a number of uses of the drug delivery system or drug delivery device 1, a time since one of the drug delivery system or device and the capturing system 100 has been used for the first time and/or a number of replaceable drug containers used with the drug delivery system. In this way other criteria for determining of an end-of-lifecycle of the capturing system and/or of the drug delivery system or drug delivery device can be implemented. For instance the end-of-life identifying unit 120 may be configured to count a number of doses or a number of uses of the drug delivery system 1. If for instance a predefined maximum allowable number of, e.g., 200 uses has been exceeded or has been reached the end-of-life identifying unit 120 may be operable to switch the data reading disabling unit 160 into the activated state thereby disabling readout of stored data 126.

Similarly and when the electronically-controlled capturing system 100 is equipped with a non-rechargeable finite reservoir of electric energy 117, which is known to last a predefined time interval starting from a first activation of the capturing system, the counter 121 may be operable to count the time from the first activation date or time. Before or when reaching the predefined time for which the electric energy unit is guaranteed to last the end-of-life identifying unit 120 may trigger a final backup procedure of the data 126 stored in the electronic storage unit 118 and may further trigger a subsequent activation of the data reading disabling unit 160.

The end-of-life identifying unit 120 is operably connected to at least one of the data reading disabling unit 160 and the processing unit 114. With some situations it might be beneficial when the end-of-life identifying unit 120 is exclusively connected to the processing unit 114. Then, the processing unit 114 may trigger a final dialogue or communication with the user of the drug delivery device 1 before the data reading disabling unit 160 is irreversibly activated. In this way, a user is given the possibility to override, e.g., an autonomous activation of the data reading disabling unit 160 or to manually trigger an eventual erasing of data.

The block diagram of the capturing system 100 according to FIG. 7 is only illustrative. The data reading disabling unit 160 may be fully integrated into the processing unit 114. The processing unit 114 and the electronic storage unit 118 may be fully integrated into the electronic circuit 108. The electronic circuit 108 may be implemented in a microprocessor 113.

Figure 15:
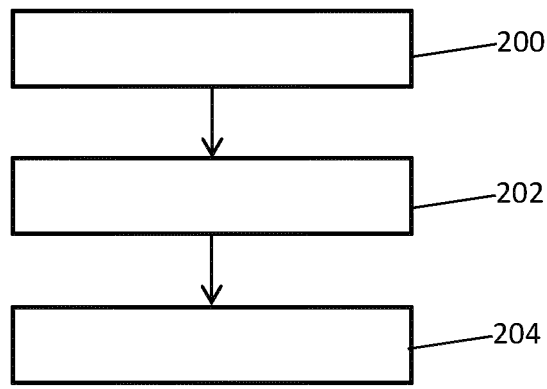
FIG. 15 represents a flowchart of a method of disabling data readout.

In FIG. 15, three consecutive steps 200, 202, 204 of a method of disabling readout or providing of data from the electronic storage unit 118 of the data capturing system 100 are illustrated. In a first step 200 the end-of-life of the drug delivery system or of the drug delivery device 1 has been detected or determined by a user of the respective device. In step 202 the data reading disabling unit 160 is switched into the activated state. Subsequently and in step 204 when activated the data reading disabling unit 160 persistently prevents at least one of the above described readout of stored data 126 from the electronic storage unit 118 or providing of stored data 126 from the electronic storage unit 118. Detection of the end-of-life in step 200 can be conducted in accordance to any of the above described methods and schemes. Activation of the data reading disabling unit 160 in step 202 can be conducted in accordance to any of the above described steps and schemes and the prevention of data readout or data providing in step 204 can also be conducted in any of the above described ways.

Figure 16:
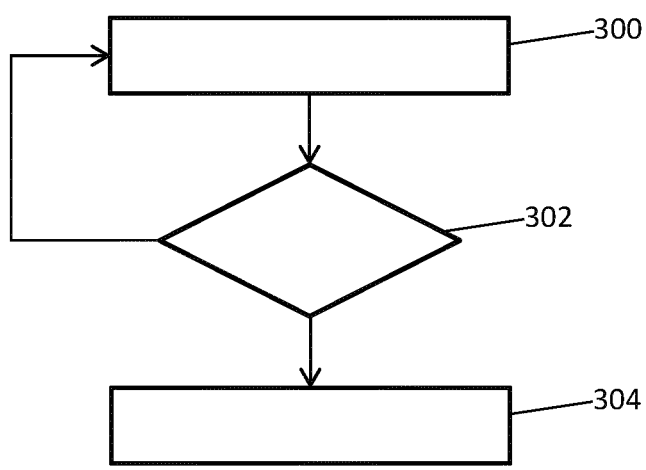
FIG. 16 illustrates another flowchart of a further method of disabling data readout.

In the further flowchart of a method of disabling readout or providing of data from an electronically-controlled capturing system as illustrated in FIG. 16, in a first step 300 an end-of-life identifying unit 120 is in a loop mode per default and repeatedly executes the steps 300 and 302. In step 300 sensor data or other input data is processed. In the subsequent step 302 the processed data is validated, e.g., compared with predefined or stored data in order to determine if an end-of-life configuration has been reached. If the end-of-life configuration has not been reached the method returns to step 300 in which further data regarding use of the drug delivery system or drug delivery device 1 is generated and/or processed. If, in step 302, the end-of-life identifying unit 120 determines that an end-of-life configuration has been reached the method proceeds with step 304. In step 304 the data reading disabling unit 160 is switched into the activated state with the above described consequences in terms of readout or providing of stored data.

With some further examples the mechanical switch 162 or the electronic switch 152 as described above could also be integrated or implemented into one of the trigger 11 and the dose dial 12. This may particularly apply to an injection device 1 as illustrated in FIG. 5. Here, the trigger 11 and/or the dose dial 12 may be connected to the input 110 operably connected to the processing unit 114. The input 110 may comprise one or several sensors or switches mechanically connected to the trigger 11 and/or the dose dial 12.

There may be numerous encoded schemes of use or operation of the dose dial 12 and/or of the trigger 11 that are interpreted by the processing unit 114 to switch the data reading disabling unit into the activated state. For instance, depressing and releasing the trigger 11 twice within a predefined time interval may be interpreted by one of the processing unit 114 and the end-of-life identifying unit 120 as an end-of-life signal. When detected and correctly interpreted at least one of the processing unit 114 and the end-of-life identifying unit 120 is operable to switch the data reading disabling unit 160 into the activated state. In response to a switching of the data reading disabling unit 160 into the activated state the stored data 126 may be deleted in the electronic storage unit 118.

With another scheme of defining an end-of-life configuration the trigger 11 may be depressed and released twice without dialing a dose between the first and second depressing action. Thereafter the dose dial 12 is set to an arbitrary unit and is hence dialed to an arbitrary unit in a dose incrementing direction. Thereafter, the dose dial 12 is dialed in the opposite sense and returns into the zero dose configuration. For confirming of a delete or end-of-lifecycle configuration the trigger 11 is pressed once again.

With a further example the dose dial 12 is dialed to an arbitrary unit larger than 1. Within a predefined time interval after reaching the predefined dose size the dose dial is dialed back along the dose decrementing direction until a zero dose configuration has been reached again. In this zero does configuration the trigger is depressed once. Then and after a predefined time interval has lapsed the trigger is depressed for a second time. This scenario of use may be equally interpreted as an end-of-life signal by way of which the processing unit 114 and/or the end-of-life identifying unit 120 triggers the data reading disabling unit 160 to switch into the activated state.

With a further example, the dose dial 12 is dialed in a dose incrementing direction to a predefined dose size. Thereafter it is dialed in the opposite direction, i.e. in dose decrementing direction into the initial zero dose configuration. Thereafter, the trigger 11 is depressed once. For confirming the activation of the data reading disabling unit 160 the dose dial 12 is dialed onto a predetermined dose size and is subsequently dialed in the opposite direction until the zero dose configuration has been reached again.

These and other examples typically apply with drug delivery devices 1 having an integrated capturing system 100 and wherein dialing of the dose dial 12 and depressing of the trigger 11 are electronically detected and/or quantitatively measured.

With a further example the capturing system 100 is equipped with a torque sensor. Such a torque sensor is one example of a sensor 130 belonging to the end-of-life identifying unit 120 as illustrated in FIG. 7. There may be provided a tactile stop defining a zero dose position of the dose dial. In one scenario of use, the dose dial 12 is rotated in a dose decrementing direction when in the zero dose configuration. Here, the stop prevents a dialing of the dose dial 12 in the dose decrementing direction. However, the torque applied by a user onto the dose dial 12 and against the stop is measured by the torque sensor. If a user holds or rotates the dose dial 12 against the tactile end stop for a period of time exceeding a predefined time interval this will be interpreted as an end-of-life signal. Accordingly, the processing unit 114 and/or the end-of-life identifying unit 120 will be operable to switch the data reading disabling unit 160 into the activated state.

With a further example the dose dial button is rotated against the tactile stop during a predefined time interval, e.g., larger than or equal to one second. The dose dial 12 is held in this button configuration. In order to confirm the activation of the data reading disabling unit 160 the user has to depress the trigger 11 once thereafter.

In a further example the dose dial 12 is rotated against the zero dose stop and is kept in this zero dose configuration for a predefined time interval, e.g., larger than or equal to one second. Before the data reading disabling unit is switched into the activated state the detected rotation of the dose dial 12 has to be confirmed by the user, e.g., by rotating the dose dial 12 in the dose incrementing direction 4 until a predefined or an arbitrary dose has been set and by rotating the dose dial thereafter in the opposite dose decrementing direction 5 until the zero dose configuration has been reached again.

For a confirmation of switching the data reading disabling unit 160 into the activated state it is even conceivable, that the dose dial 12 is released after being rotated against the mechanical stop for the predefined time interval. Hence, for a second predefined time interval no torque should be applied to the dose dial 12. Thereafter the dose dial 12 may be repeatedly rotated against the stop and may be kept in this stop configuration for a third predefined time interval. The first, the second and the third time intervals may be larger than or equal to one second.

With some other examples a user actuated end-of-life or a user activated activation of the data reading disabling unit 160 can be implemented with a drug delivery device 1 with an integrated capturing system 100 as for instance illustrated in FIG. 5. There, the trigger 11 may be depressed for a certain while, e.g., during a predefined time interval until the output 112, e.g., in form of a display indicates to a user, that the data erase mode has been activated. For confirming erase of data the user may have to depress the trigger 11 once again.

In another example the trigger 11 has to be depressed at least once. Thereafter the dose dial 12 has to be rotated against the zero dose stop. It is kept in the zero dose stop until the erase mode is indicated in the output 112. For confirming of the erasing of data the trigger 11 has to be depressed at least once again.

With a further example and for activating erasing of data 126 the trigger 11 has to be depressed at least once. The dose dial 12 is thereafter rotated against the zero dose stop and is kept in this zero dose position until the erase mode is activated. For confirming the erase action the dose dial 12 has to be rotated again against the zero dose stop and has to be kept in this configuration or position for a predetermined time interval.

With a further example the erasing or deletion of data 126 can be triggered by a user by rotating the dose dial 12 against the zero dose stop for a predetermined time interval, e.g., larger than or equal to one second. The dose dial 12 is kept in this configuration until activation of the erase mode is indicated, e.g., by the output 112. In order to confirm the erasing of data the trigger 11 has to be depressed at least once.

With a further example and after activating of the erase mode as described above for confirming the erasing of data the dose dial 12 is rotated again against the zero dose stop and is held in this configuration until erasing of data is confirmed by the output 112. For indicating the activation of the erase mode and/or for indicating completion of a data erase operation the output 112 may comprise a display or at least one or several light emitting elements, such as a LED configured to flash in a continuous, in an interrupted or in a repetitive mode. Numerous or a single LED may also be configured to light up in one or different colors being thus indicative of the activation of a data erase mode and/or being indicative of completion of deleting or erasing of data.

LIST OF REFERENCE NUMBERS 1 drug delivery device
2 distal direction
3 proximal direction
4 dose incrementing direction
5 dose decrementing direction
6 drug container
7 bung
10 housing
11 trigger
12 dose dial
13 dosage window
14 drug container holder
15 needle assembly
16 inner needle cap
17 outer needle cap
18 protective cap
19 window
20 threaded socket
21 through opening
22 needle hub
24 injection needle
26 piston rod
28 pressure piece
30 drive mechanism
40 external electronic device
50 dial extension
52 dose dial sleeve
60 external electronic device
80 network
90 database
100 capturing system
101 housing
102 data capturing device
103 data link
104 data link
105 data link
106 data link
110 input
111 data transmission interface
112 output
113 microprocessor
114 processing unit
115 supply connection
116 electric energy unit
117 electric energy reservoir
118 electronic storage unit
120 end-of-life identifying unit 121 counter
122 clock generator
124 encoder/decoder
126 data
130 sensor
132 controller
134 data exchange detector
140 volatile storage
142 non-volatile storage
144 key
150 power management
152 electronic switch
154 electric load
156 power management IC
158 antenna
160 data reading disabling unit
162 mechanical switch
171 trigger

The invention claimed is:

1. An electronically-controlled capturing system for capturing data representing an amount of a drug expelled or discharged from a drug reservoir by a drug delivery system, the capturing system comprising an electronic circuit, the electronic circuit comprising:
   an electric energy unit comprising a reservoir of electric energy,
   a processing unit operable by electric power obtained from the electric energy unit, the processing unit being operable to acquire data,
   an electronic storage unit connected to the processing unit, the electronic storage unit being configured to store the acquired data,
   wherein the processing unit is operable to write the acquired data in the electronic storage unit and wherein the processing unit is operable to read the stored data from the electronic storage unit and to provide the stored data from the electronic storage unit,
   a data reading disabling unit operably connected to at least one of the processing unit, the electronic storage unit and the electric energy unit, the data reading disabling unit being irreversibly switchable into an activated state in which the data reading disabling unit persistently prevents at least one of:
   readout of the stored data from the electronic storage unit, or
   providing of the stored data from the electronic storage unit.

2. The capturing system according to claim 1, wherein the data reading disabling unit is operable to disconnect the processing unit from at least one of the electronic storage unit and the electric energy unit when in the activated state.

3. The capturing system according to claim 1, wherein the data reading disabling unit is operable to disconnect the electric energy unit from the processing unit when in the activated state.

4. The capturing system according to claim 1, wherein the data reading disabling unit is operable to discharge the electric energy unit when in the activated state.

5. The capturing system according to claim 1, wherein the data reading disabling unit is operable to delete the stored data from the electronic storage unit when in the activated state.

6. The capturing system according to claim 1, further comprising a data transmission interface connected to the processing unit and connectable to an external electronic device, wherein the data reading disabling unit is operable to disrupt or to disable a data transmitting connection between the processing unit and the data transmission interface.

7. The capturing system according to claim 1, wherein the electronic circuit further comprises an end-of-life identifying unit being operable to determine and/or to indicate an end-of-life of at least one of the capturing system and the drug delivery system.

8. The capturing system according to claim 7, wherein the end-of-life identifying unit is operably connected to the data reading disabling unit and wherein the end-of-life identifying unit is operable to set the data reading disabling unit in the activated state.

9. The capturing system according to claim 7, wherein the end-of-life identifying unit is operable to determine an available amount of electric energy of the electric energy unit and wherein the end-of-life identifying unit is operable to compare the available amount of electric energy with a predefined minimum amount of electric energy of the electric energy unit.

10. The capturing system according to claim 1, wherein the processing unit is provided by a microprocessor or wherein the processing unit is implemented in the microprocessor.

11. The capturing system according to claim 1, wherein the data reading disabling unit comprises at least one of an electronic switch and a mechanical switch each of which being operable to switch the data reading disabling unit into the activated state.

12. An electronically-controlled capturing system for capturing data representing an amount of a drug expelled or discharged from a drug reservoir by a drug delivery system, the capturing system comprising an electronic circuit, the electronic circuit comprising:
   an electric energy unit comprising a reservoir of electric energy,
   a processing unit operable by electric power obtained from the electric energy unit, the processing unit being operable to acquire data,
   an electronic storage unit connected to the processing unit, the electronic storage unit being configured to store the acquired data,
   wherein the processing unit is operable to write the acquired data in the electronic storage unit and wherein the processing unit is operable to read the stored data from the electronic storage unit and to provide the stored data from the electronic storage unit,
   a data reading disabling unit operably connected to at least one of the processing unit, the electronic storage unit and the electric energy unit, the data reading disabling unit being switchable into an activated state in which the data reading disabling unit persistently prevents at least one of:
   readout of the stored data from the electronic storage unit, or
   providing of the stored data from the electronic storage unit, wherein when in the activated state the data reading disabling unit is operable:
   i) to irreversibly encrypt the acquired data or the stored data in the electronic storage unit, or
   ii operable to prevent decryption of stored data, wherein the stored data is stored in the electronic storage unit in an encrypted format.

13. The capturing system according to claim 12, wherein an encryption key or decryption key is stored in a volatile memory block of the electronic storage unit and wherein upon activation of the data reading disabling unit the encryption key or decryption key is deleted or a supply of electric energy for the electronic storage unit is cut off.

14. A data capturing device configured for attachment to a drug delivery system, the data capturing device being operable to collect data being indicative of an amount of a drug expelled or discharged from a drug container of the drug delivery system, the data capturing device including a housing and
a capturing system comprising:
an electronic circuit including an electric energy unit comprising a reservoir of electric energy,
a processing unit operable by electric power obtained from the electric energy unit, the processing unit being operable to acquire data,
an electronic storage unit connected to the processing unit, the electronic storage unit being configured to store the acquired data,
wherein the processing unit is operable to write the acquired data in the electronic storage unit and wherein the processing unit is operable to read the stored data from the electronic storage unit and to provide the stored data from the electronic storage unit,
a data reading disabling unit operably connected to at least one of the processing unit, the electronic storage unit and the electric energy unit, the data reading disabling unit being irreversibly switchable into an activated state in which the data reading disabling unit persistently prevents at least one of:
readout of the stored data from the electronic storage unit, or
providing of the stored data from the electronic storage unit.

15. A drug delivery system for expelling or discharging of an amount of a drug, the drug delivery system comprising:
a housing configured to accommodate a drug container filled with the drug,
a drive mechanism operable to expel or to discharge the amount of the drug from the drug container, and
a data capturing system disposed inside or on the housing, the data capturing system comprising:
an electronic circuit including an electric energy unit comprising a reservoir of electric energy,
a processing unit operable by electric power obtained from the electric energy unit, the processing unit being operable to acquire data,
an electronic storage unit connected to the processing unit, the electronic storage unit being configured to store the acquired data,
wherein the processing unit is operable to write the acquired data in the electronic storage unit and wherein the processing unit is operable to read the stored data from the electronic storage unit and to provide the stored data from the electronic storage unit,
a data reading disabling unit operably connected to at least one of the processing unit, the electronic storage unit and the electric energy unit, the data reading disabling unit being irreversibly switchable into an activated state in which the data reading disabling unit persistently prevents at least one of:
readout of the stored data from the electronic storage unit, or
providing of the stored data from the electronic storage unit.

16. A method of disabling readout or providing of data from an electronic storage unit of a data capturing system comprising an electronic circuit including an electric energy unit comprising a reservoir of electric energy, a processing unit operable by electric power obtained from the electric energy unit, the processing unit being operable to acquire data, an electronic storage unit connected to the processing unit, the electronic storage unit being configured to store the acquired data, wherein the processing unit is operable to write the acquired data in the electronic storage unit and wherein the processing unit is operable to read the stored data from the electronic storage unit and to provide the stored data from the electronic storage unit, a data reading disabling unit operably connected to at least one of the processing unit, the electronic storage unit and the electric energy unit, the data reading disabling unit being irreversibly switchable into an activated state in which the data reading disabling unit persistently prevents at least one of readout of the stored data from the electronic storage unit, or providing of the stored data from the electronic storage unit, the method comprising:
setting of the data reading disabling unit into the activated state, and
persistently preventing at least one of: readout of the stored data from the electronic storage unit, or providing of the stored data from the electronic storage unit.

17. The method of claim 16, further comprising detecting an end-of-life of the data capturing system.

18. The method of claim 17, wherein detecting the end-of-life includes determining an available amount of electric energy of the electric energy unit and comparing the available amount of electric energy with a predefined minimum amount of electric energy of the electric energy unit.

* * * * *